US012097431B2

(12) United States Patent
Wong et al.

(10) Patent No.: US 12,097,431 B2
(45) Date of Patent: Sep. 24, 2024

(54) GOAL DRIVEN ANIMATION

(71) Applicant: Electronic Arts Inc., Redwood City, CA (US)

(72) Inventors: David Wong, Burnaby (CA); Hitoshi Nishimura, Burnaby (CA)

(73) Assignee: Electronic Arts Inc., Redwood City, CA (US)

( * ) Notice: Subject to any disclaimer, the term of this patent is extended or adjusted under 35 U.S.C. 154(b) by 317 days.

(21) Appl. No.: 17/669,927

(22) Filed: Feb. 11, 2022

(65) Prior Publication Data
US 2023/0256339 A1 Aug. 17, 2023

(51) Int. Cl.
*A63F 13/57* (2014.01)
*G06T 7/73* (2017.01)
*G06T 13/00* (2011.01)

(52) U.S. Cl.
CPC .......... *A63F 13/57* (2014.09); *G06T 7/73* (2017.01); *G06T 13/00* (2013.01); *G06T 2207/20084* (2013.01); *G06T 2207/30204* (2013.01)

(58) Field of Classification Search
CPC .......... A63F 2300/5553; A63F 13/67; A63F 13/573; A63F 13/57; G06T 2207/20084;
(Continued)

(56) References Cited

U.S. PATENT DOCUMENTS 10,853,970 B1 * 12/2020 Akbas ............... G06T 1/0007
11,244,475 B2 * 2/2022 Zakharov ............. G06T 7/70
(Continued)

OTHER PUBLICATIONS

Jacobs, Robert A., et al., Adaptive Mixtures of Local Experts, Neural Computation 3, 79-87 (1991), Massachusetts Institute of Technology, 9 pages, dated Apr. 27, 1990.
(Continued)

Primary Examiner — Steve Rowland
(74) Attorney, Agent, or Firm — Gray Ice Higdon

(57) ABSTRACT

The specification relates to the generation of in-game animation data and the evaluation of in-game animations. According to a first aspect of the present disclosure, there is described a computer implemented method comprising: inputting, into one or more neural network models, input data comprising one or more current pose markers indicative of a current pose of an in-game object, one or more target markers indicative of a target pose of an in-game object and an object trajectory of the in-game object; processing, using the one or more neural networks, the input data to generate one or more intermediate pose markers indicative of an intermediate pose of the in-game object positioned between the current pose and the target pose; outputting, from the one or more neural networks, the one or more intermediate pose markers; and generating, using the one or more intermediate pose markers, an intermediate pose of the in-game object, wherein the intermediate pose of the in-game object corresponds to a pose of the in-game object at an intermediate frame of in-game animation between a current frame of in-game animation in which the in-game object is in the current pose and a target frame of in-game animation in which the in-game object is in the target pose.

14 Claims, 17 Drawing Sheets

(58) Field of Classification Search
CPC .. G06T 2207/30204; G06T 13/00; G06T 7/73
See application file for complete search history.

(56) References Cited

U.S. PATENT DOCUMENTS

| | | | | |
|---|---|---|---|---|
| 11,830,121 | B1* | 11/2023 | Starke | G06N 3/02 |
| 2020/0265294 | A1* | 8/2020 | Kim | G06T 13/40 |
| 2020/0302634 | A1* | 9/2020 | Pollefeys | G06T 7/70 |
| 2021/0064925 | A1* | 3/2021 | Shih | G06N 3/084 |
| 2021/0312688 | A1* | 10/2021 | Akhoundi | G06N 3/088 |
| 2021/0375023 | A1* | 12/2021 | Kothari | G06N 3/044 |
| 2022/0044125 | A1* | 2/2022 | Rangu | G06N 3/088 |
| 2022/0108422 | A1* | 4/2022 | Choi | G06T 17/20 |
| 2022/0270314 | A1* | 8/2022 | Navarro | G06V 10/82 |
| 2022/0301252 | A1* | 9/2022 | Wang | G06N 3/048 |
| 2023/0123820 | A1* | 4/2023 | Wang | G06T 13/40 |
| | | | | 345/474 |

OTHER PUBLICATIONS

He, Kaiming, et al., Deep Residual Learning for Image Recognition, arXiv:1512.03385v1, 12 pages, dated Dec. 10, 2015.

Starke, Sebastian, et al., Local Motion Phases for Learning Multi-Contact Character Movements, ACM Trans. Graph, vol. 39, No. 4, Article 1, 14 pages, dated Jul. 2020.

Holden, Daniel, et al., Phase-Functioned Neural Networks for Character Control, ACM Transactions on Graphics, vol. 36, No. 4, Article 42, 13 pages, dated Jul. 2017.

* cited by examiner

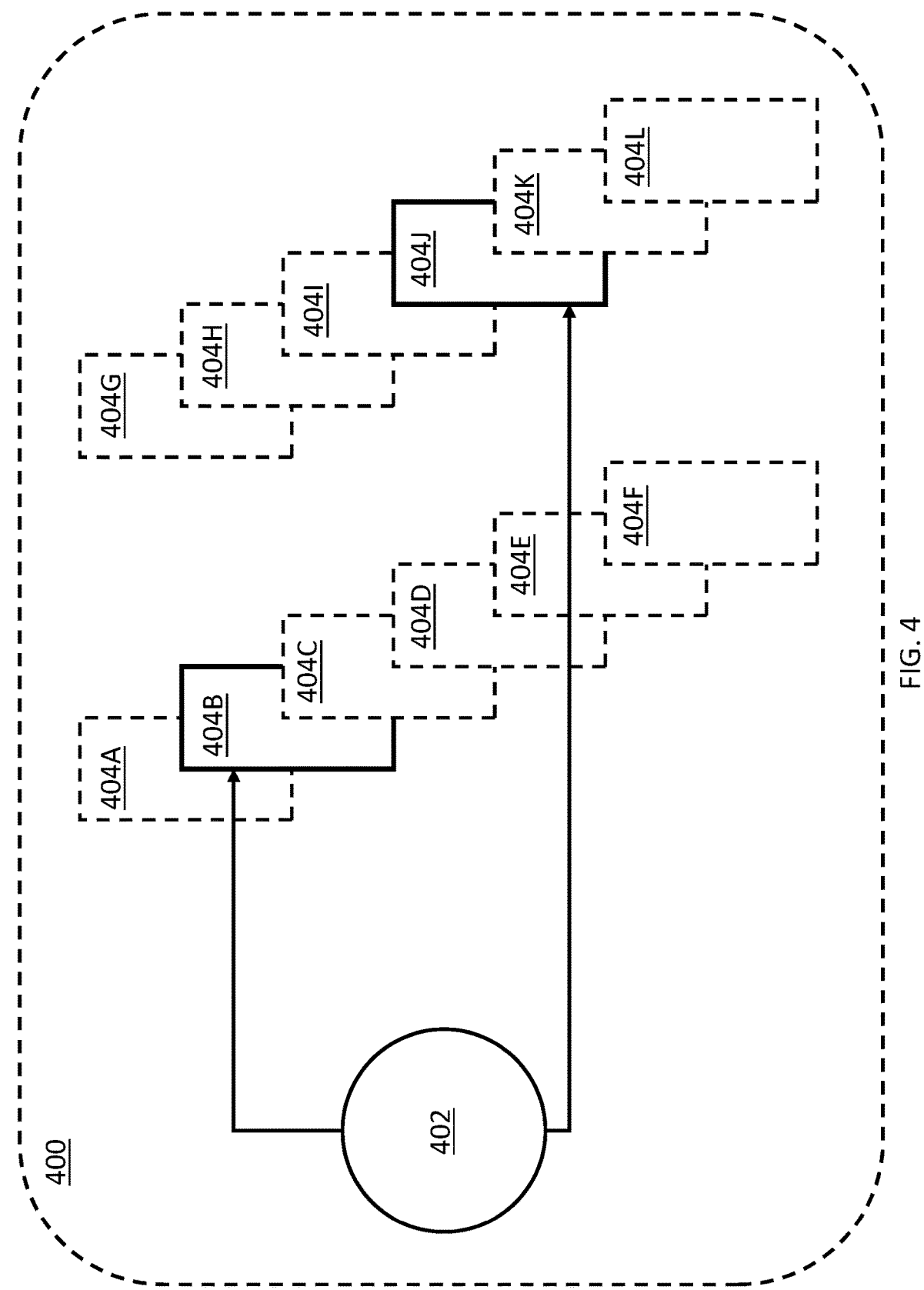

GOAL DRIVEN ANIMATION

BACKGROUND

The specification relates to the generation of in-game animation data and the evaluation of in-game animations.

In dynamic gameplay in computer games, such as gameplay that includes a number of characters, it is difficult to account for all of the possible transition animations that may occur. Lack of data can lead to an unrealistic or unnatural result in the types of transition animations that are created.

Furthermore, the quality of in-game animations can also be time consuming to assess manually, requiring a great deal of time to identify and categorize animations containing errors. This can make it difficult or impossible to correct animations in near real-time as they are generated.

SUMMARY

According to a first aspect of the present disclosure, there is described a computer implemented method comprising: inputting, into one or more neural network models, input data comprising one or more current pose markers indicative of a current pose of an in-game object, one or more target markers indicative of a target pose of an in-game object and an object trajectory of the in-game object; processing, using the one or more neural networks, the input data to generate one or more intermediate pose markers indicative of an intermediate pose of the in-game object positioned between the current pose and the target pose; outputting, from the one or more neural networks, the one or more intermediate pose markers; and generating, using the one or more intermediate pose markers, an intermediate pose of the in-game object, wherein the intermediate pose of the in-game object corresponds to a pose of the in-game object at an intermediate frame of in-game animation between a current frame of in-game animation in which the in-game object is in the current pose and a target frame of in-game animation in which the in-game object is in the target pose.

The method may further comprise: inputting, into the one or more neural networks, a second set of input data comprising the one or more intermediate pose markers, the one or more target markers and the object trajectory; processing, using the one or more neural networks, the second set of input data to generate one or more further intermediate pose markers indicative of a further intermediate pose of the in-game object positioned between the intermediate pose of the in-game object and the target pose of the in-game object; outputting, from the one or more neural networks, the one or more further intermediate pose markers; and generating, using the one or more further intermediate pose markers, a further intermediate pose of the in-game object, wherein the further intermediate pose of the in-game object corresponds to a pose of the in-game object at a further intermediate frame of in-game animation between the intermediate frame of in-game animation and the target frame of in-game animation in which the in-game object is in the target pose.

The method may further comprise: determining one or more phases of the current pose; and selecting the one or more neural networks from a plurality of neural networks in dependence on the one or more phases. Selecting the one or more neural networks from a plurality of neural networks may comprise: selecting two or more neural networks of the plurality of neural networks in dependence on the one or more phases of the current pose, wherein outputting the one or more intermediate pose markers comprises combining output of the selected two or more neural networks. Selecting two or more neural networks of the plurality of neural networks may comprise: determining, using a gating neural network, a score for each of the plurality of neural networks; and selecting two or more neural networks of the plurality of neural networks in dependence on the scores for each of the plurality of neural networks.

The input data further may comprise one or more previous pose markers indicative of one or more previous poses of the in-game object occurring prior to the current pose.

The one or more neural networks may comprise: a fully connected network; a mixture of experts network; and/or a residual network The in-game object may be a human. The one or more current pose markers, one or more target pose markers and/or the one or more intermediate pose markers may comprise one or more of: one or more footstep markers; one or more hand markers; one or more hip markers; one or more chest markers and one or more head markers.

According to a further aspect of the present disclosure, there is described a non-transitory computer readable medium comprising computer readable instructions that, when executed by a computing device, causes the computing device to perform operations comprising: inputting, in to one or more neural network models, input data comprising one or more current pose markers indicative of a current pose of an in-game object, one or more target markers indicative of a target pose of an in-game object and an object trajectory of the in-game object; processing, using the one or more neural networks, the input data to generate one or more intermediate pose markers indicative of an intermediate pose of the in-game object positioned between the current pose and the target pose; outputting, from the one or more neural networks, the one or more intermediate pose markers; and generating, using the one or more intermediate pose markers, an intermediate pose of the in-game object, wherein the intermediate pose of the in-game object corresponds to a pose of the in-game object at an intermediate frame of in-game animation between a current frame of in-game animation in which the in-game object is in the current pose and a target frame of in-game animation in which the in-game object is in the target pose.

The operations may further comprise: inputting, into the one or more neural networks, a second set of input data comprising the one or more intermediate pose markers, the one or more target markers and the object trajectory; processing, using the one or more neural networks, the second set of input data to generate one or more further intermediate pose markers indicative of a further intermediate pose of the in-game object positioned between the intermediate pose of the in-game object and the target pose of the in-game object; outputting, from the one or more neural networks, the one or more further intermediate pose markers; and generating, using the one or more further intermediate pose markers, a further intermediate pose of the in-game object, wherein the further intermediate pose of the in-game object corresponds to a pose of the in-game object at a further intermediate frame of in-game animation between the intermediate frame of in-game animation and the target frame of in-game animation in which the in-game object is in the target pose.

The operations may further comprise: determining one or more phases of the current pose; and selecting the one or more neural networks from a plurality of neural networks in dependence on the one or more phases. Selecting the one or more neural networks from a plurality of neural networks comprises: selecting two or more neural networks of the plurality of neural networks in dependence on the one or more phases of the current pose, wherein outputting the one or more intermediate pose markers comprises combining output of the selected two or more neural networks. Selecting two or more neural networks of the plurality of neural networks may comprise: determining, using a gating neural network, a score for each of the plurality of neural networks; and selecting two or more neural networks of the plurality of neural networks in dependence on the scores for each of the plurality of neural networks.

The input data further may comprises one or more previous pose markers indicative of one or more previous poses of the in-game object occurring prior to the current pose.

The one or more neural networks may comprise: a fully connected network; a mixture of experts network; and/or a residual network The in-game object may be a human. The one or more current pose markers, one or more target pose markers and/or the one or more intermediate pose markers comprise one or more of: one or more footstep markers; one or more hand markers; one or more hip markers; one or more chest markers and one or more head markers.

According to a further aspect of the present disclosure, there is described a computer implemented method comprising: inputting, into one or more neural networks, input data comprising a first set of markers corresponding to a pose of an object at a first time, a second set of markers corresponding to a pose of an object at a second time and an object trajectory between the first time and second time, wherein the second time is later than the first time; generating, by the one or more neural networks, a candidate set of pose markers corresponding to a candidate pose of the object at a third time, wherein the third time is between the first time and second time; comparing the candidate set of markers to a corresponding ground truth sets of markers corresponding to ground truth poses of the object at the third time; and updating parameters of the one or more neural networks based on the comparison between the candidate set of markers and the ground truth set of markers.

Comparing the candidate set of markers to the ground truth set of markers may comprise determining a value of an objective function, wherein the objective function comprises a weighted sum of differences between respective markers in the candidate set of markers and respective corresponding markers in the ground truth set of markers.

The object may be a humanoid. The markers corresponding to feet of the humanoid may be weighted higher than other markers in the one or more objective functions.

The method may further comprise: determining one or more phases of the pose of the object at the first time; and selecting the one or more neural networks from a plurality of neural networks in dependence on the one or more phases.

BRIEF DESCRIPTION OF THE DRAWINGS

Example embodiments will now be described by way of non-limiting example, with reference to the accompanying drawings, in which:

FIG. 4 shows an example of a gated neural network for use in goal driven animation;

DETAILED DESCRIPTION

Figure 1:
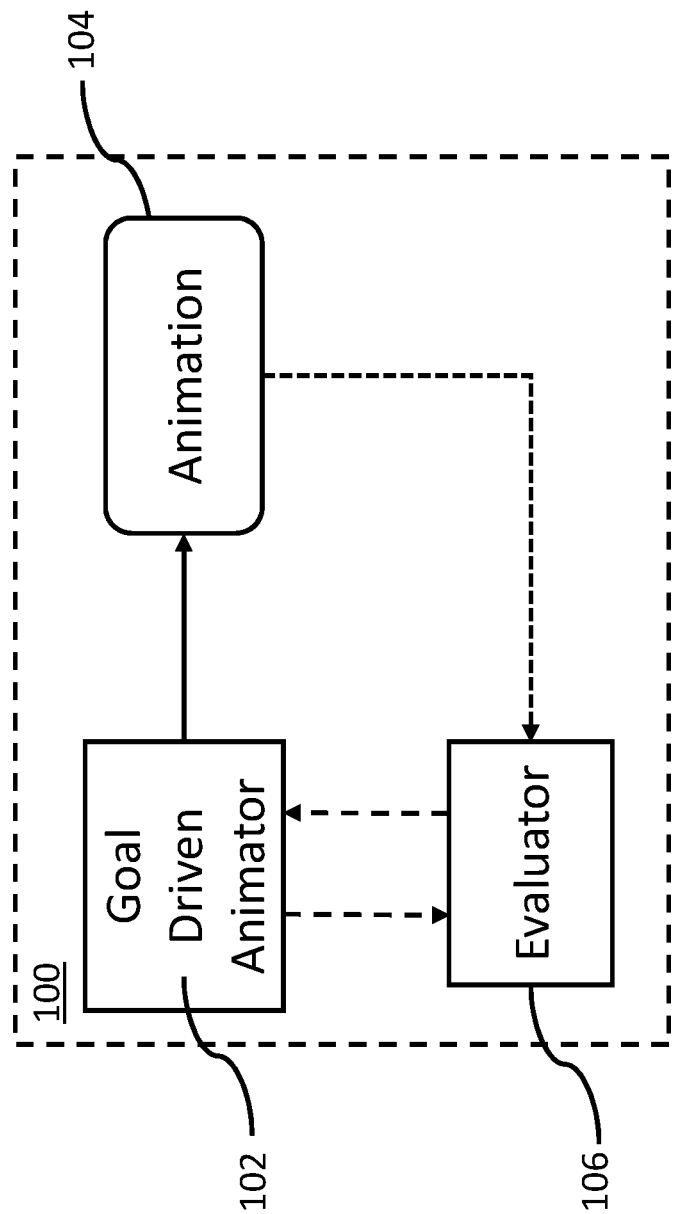
FIG. 1 shows a schematic overview of an example animation system for generating and/or assessing animations.

FIG. 1 shows a schematic overview of an example animation system too for generating and/or assessing animations.

The animation system comprises a goal-driven animator 102 configured to generate goal driven animation (GDA) such as animation data 104 (e.g. animation frames, markers for poses of objects in animation frames or the like) using goal driven animation. The goal-driven animator 102 is a system and/or method (e.g., as defined by computer readable instructions) that generates transition animations (e.g. intermediate animation frames) based on a current pose and a real-time goal (e.g. target pose or target animation), thereby enabling the creation of animation transitions that are as dynamic as the gameplay in which they can be used. The transition animations are based in part on a path through the game environment (referred to herein as a "trajectory") that is calculated between a current pose and a target animation pose.

The system may further comprise an animation evaluator 106, configured to assess the quality of the animation data 104 generated by the goal-driven animator 102, and/or other animation data used in gameplay. The animation evaluator 106 may further be configured to identify animation errors in animations.

The results of the evaluations of the animation evaluator may be used by the goal-driven animator 102 to update the generated animation 104 to correct any identified errors. Alternatively, the animation evaluator 106 may be configured to apply animation corrections itself.

The goal-driven animator 102 and animation evaluator 106 may be used together in a system as shown in FIG. 1. Alternatively or additionally, they may be used individually; the goal-driven animator 102 may be used to generate animations 104 without evaluation by the animation evaluator 106, while the animation evaluator 106 may be used to evaluate animations that do not originate from the goal-driven animator 102.

The goal-driven animator 102 is described in further detail below with respect to FIGS. 2-8. The animation evaluator is described in further detail below with respect to FIGS. 9-14.

GDA may be used to improve transition animations, particularly when player characters are being affected at a moment's notice. For example, GDA is useful in a variety of scenarios that involve highly dynamic aspects, such as when characters are suddenly interacting with a ball in a soccer game. Its use also provides tuneable, high level control of animations, and can reduce the errors in generated animations, for example by distributing the errors over the whole path instead of using a last minute bailout.

Figure 2:
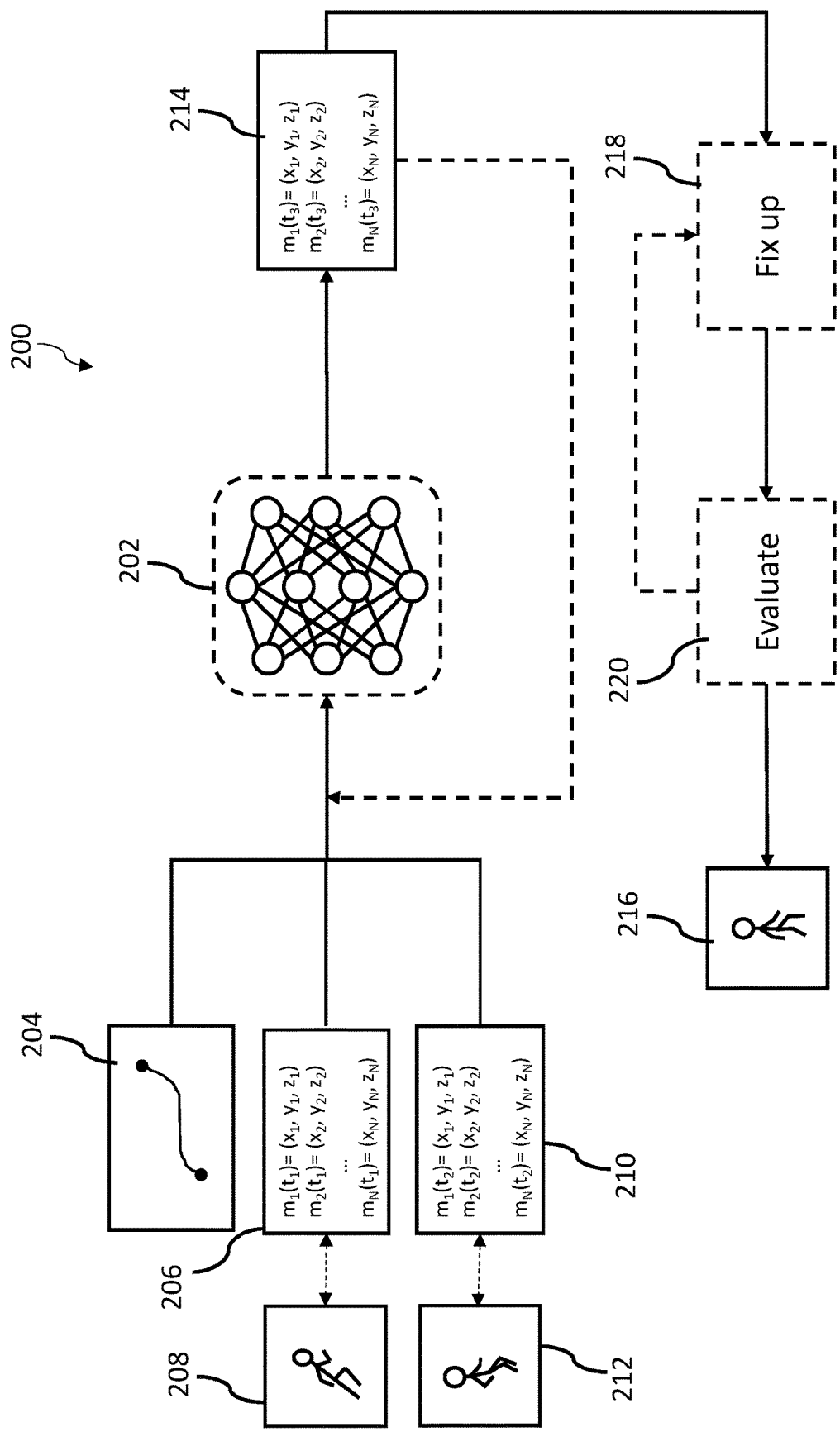
FIG. 2 shows a schematic overview of a method for goal driven animation.

FIG. 2 shows a schematic overview of a method 200 for goal driven animation (GDA). The method may be implemented by one or more computers operating in one or more locations.

Input data is input into one or more neural network models 202. The input data comprises trajectory data 204 indicating a trajectory of an in-game object through a game environment/space, current pose data 206 (also referred to herein as "current pose markers") indicative of a current pose 208 of the in-game object and target pose data 210 (also referred to herein as "target pose markers") indicative of a target pose 212 of the in-game object. The current pose markers 206 correspond to the pose of an in-game object at a first time, $t_1$. The target pose markers 210 correspond to the pose of an in-game object at a second time, $t_2$. The second time is later than the first time.

The one or more neural network models 202 processes the input data to generate output data 214 comprising data indicative of intermediate pose (also referred to herein as "intermediate pose markers" and/or "intermediate pose data") of the in-game object that lies between the current pose 208 and the target pose 212 of the in-game object. In other words, the intermediate pose markers 214 correspond to a pose of the in-game object at a third time, $t_3$, which lies between the first and second time.

The output data 214 is used to generate an animation frame 216 comprising the in-game object in the intermediate pose.

In some implementations, the one or more neural networks output all pose markers required to animate the in-game object at the intermediate time. The animation frame can then be constructed directly from the output pose markers.

In some implementations, the one or more neural networks may output a subset of the pose markers required to animate the in-game object at the intermediate time. In such implementations, an inverse kinematics process may be used to reconstruct the remaining pose markers and/or the pose of the in-game object. An example of such an inverse kinematics process is Deep Neural Network Inverse Kinematics (DNNIK), described in co-pending U.S. Pat. No. 10,535,174 B1 ("Particle-based inverse kinematic rendering system"), the contents of which are incorporated herein by reference in their entirety.

For example, where the in-game object is a human, the output data may include hand markers, feet markers, hip markers, head markers and chest markers. The remaining markers may be generated from these using DNNIK.

The method 200 may be iterated until the target pose 212 is reached in the animation, with the output data 214 of each iteration being used as input for the next iteration, replacing the current pose data 206 of the previous iteration. In some implementations, the trajectory data 204 may also be updated at each iteration in dependence on the output data 204.

Pose data/markers (i.e. the current pose data 206, target pose data 210 and intermediate pose data 214) may comprise locations and/or orientations of key points of a model of the in-game object. For example, the pose markers may comprise positions of key points of the object and the rotations of those points. The rotations may be represented as axes directions. For example, where the keypoint is a joint of the object, an x-axis may be defined along the child of the joint and y- and z-axes defined relative to it to define the rotation of the joint. This representation proves to be very stable, and allows high quality prediction of joint rotations by the method. Alternative rotation representations, such as angles and/or quaternions may alternatively be used. The pose data/markers may alternatively or additionally comprise parameters of a parametrized model of the in-game object.

For example, the in-game object may be a humanoid object, representation e.g. a player character or NPC, with the key points corresponding to joints and/or body parts of the humanoid. Examples of such key points include, but are not limited to: foot locations and/or orientations; toe locations and/or orientations; leg locations and/or orientations, knee locations and/or orientations; hip heights; shoulder locations and/or orientations; neck locations and/or orientations; arm locations and/or orientations, elbow locations and/or orientations; and/or hand locations and/or orientations.

Trajectory data 204 defines a path of the in-game object through the game environment from a starting location to a target location. The trajectory data 204 may comprise a sequence of object locations in the game world, each location associated with an in-game time. Alternatively, the trajectory may be represented as a set of parametrized curves, e.g. polynomials.

Positions in the trajectory data may correspond to the position of a representative part of the in-game object in the game environment. For example, the trajectory data may correspond to the location of the centre of mass of the in-game object.

In some implementations, the trajectory data 204 may be generated using a trajectory model from a current position, and a target position at a target time. Run curves may additionally be used by the trajectory model to generate the trajectory data 204.

In addition to the path of the in-game object through the game environment, the trajectory may also comprise other attributes associated with the in-game object, such as the facing of the object (e.g. the direction it is facing) and/or the cadence of the object (e.g. the cadence of a running human).

In some implementations, the one or more neural networks 202 may also receive as input data relating to one or more phases of the object/parts of the object. For example, a respective local phase of one or more parts of the object (e.g. legs, arms etc.) may additionally be input into the neural network 202.

The one or more neural networks 202 may comprise one or more of: a fully connected neural network; a convolutional neural network; a recurrent neural network; a mixture-of-experts network; and/or a residual network. Further examples of neural network structures are described below in relation to FIGS. 3A-C and FIG. 4. The one or more neural networks 202 may have been trained using any of the methods described in relation to FIGS. 6 to 8 below.

In some implementations, the method further comprises a "fix-up" operation 218. The fix-up operation 218 applies corrections to the generated intermediate pose data, resulting in physically correct intermediate markers and/or a physically correct path. The corrections may be based on applying physical constraints to the intermediate pose generator to generate a physically correct intermediate pose. Such physical constraints may, for example, include: a stride length;

constraints on the relative locations of key points of the in-game object; and/or momentum constraints (which may be based on an in-game history of the object and/or multiple frames of poses).

The corrections may, in some implementations, be based on the output of an animation evaluator 220, such as the evaluator described below in relation to FIGS. 9 to 15. The animation evaluator 220 may score the quality of the intermediate pose markers and/or the intermediate pose and identify sources of error in them. The corrections may be based on the identified sources of error.

The creation of directional paths and the use of physical constraints throughout the process enables the transition animations generated to conform to expected physical conditions for the character, making the resulting animation more realistic.

Figure 3B:
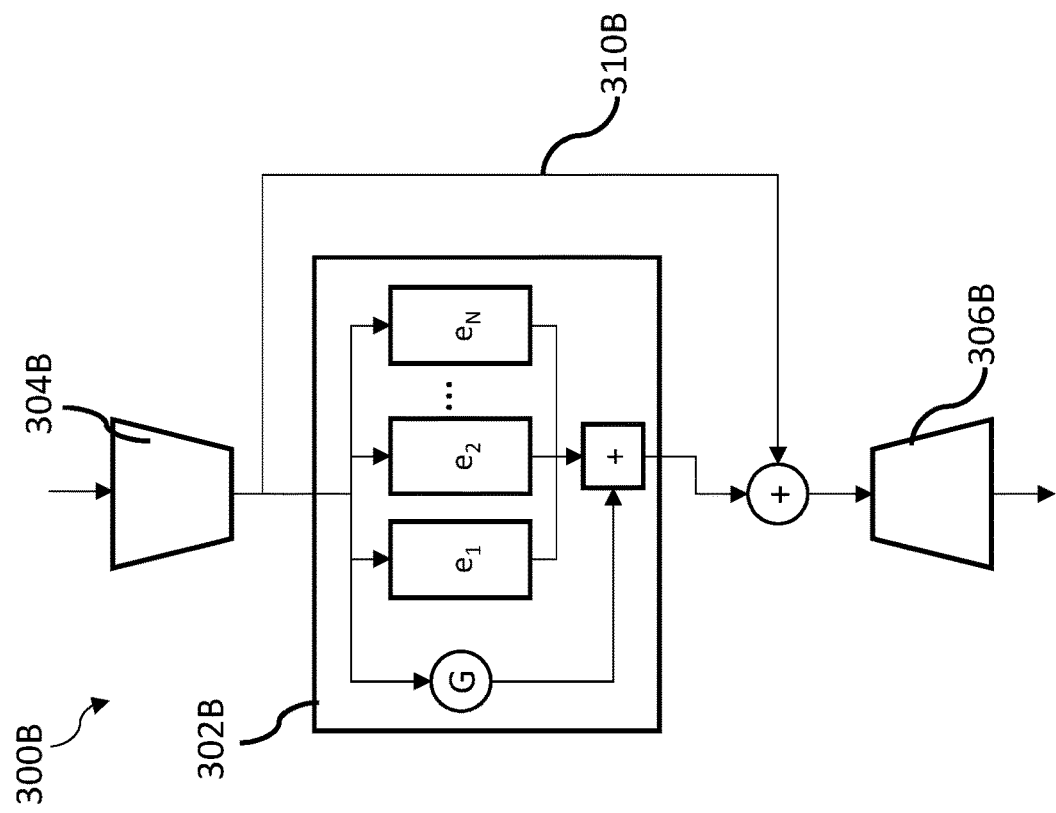
FIGS. 3A-C show examples of neural network structures for goal driven animation.
Figure 3A:
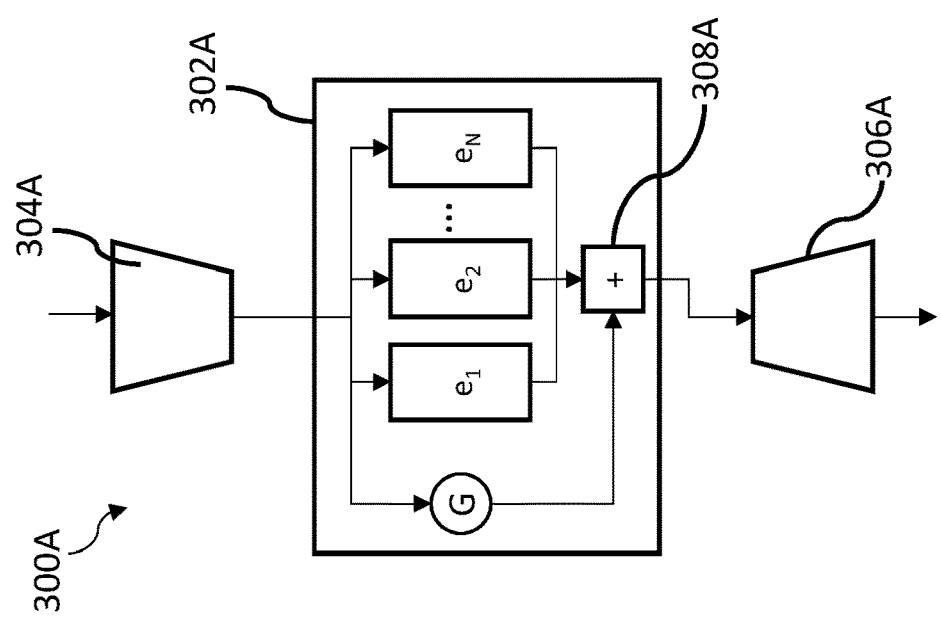
Figure 3C:
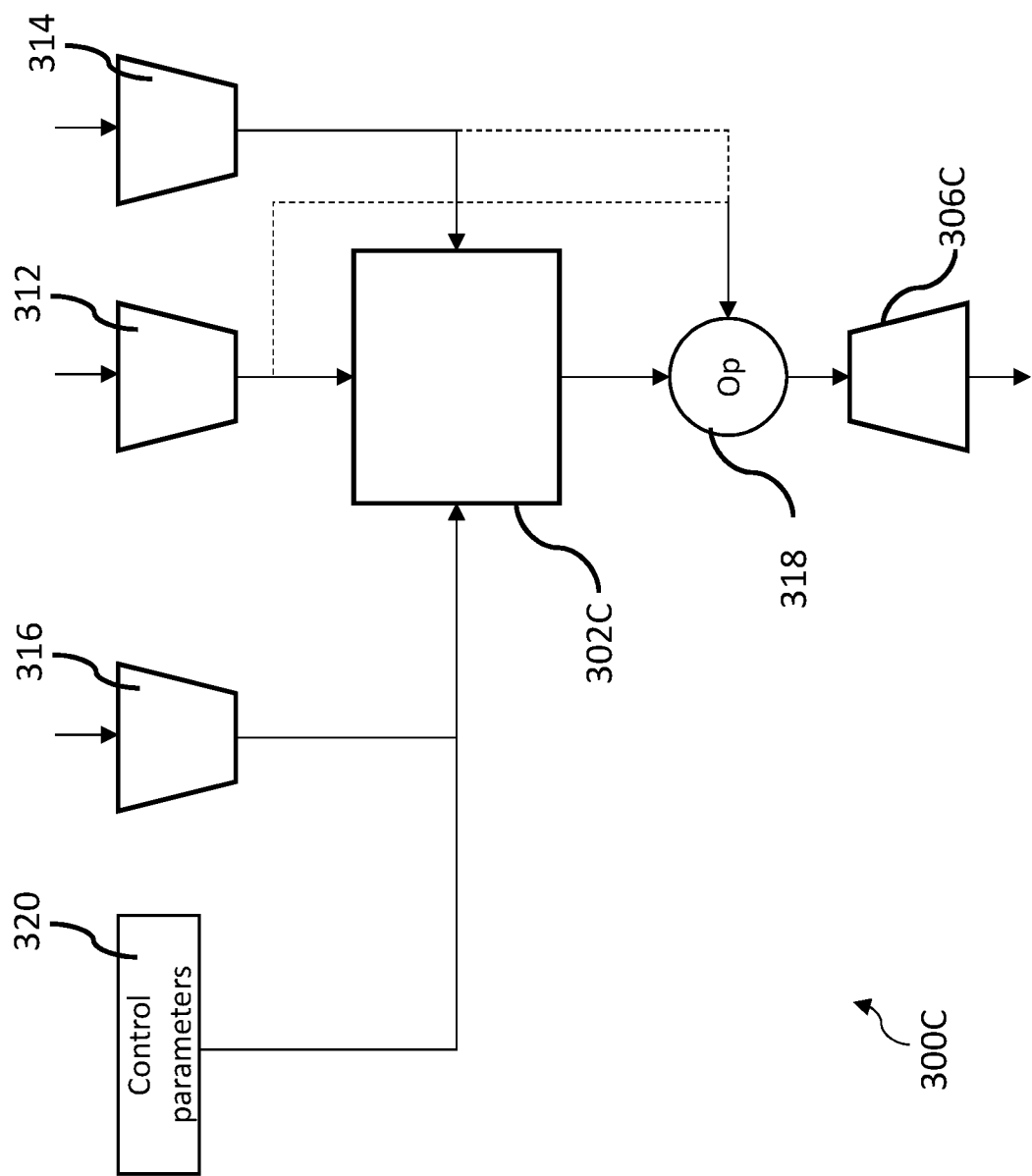

FIGS. 3A-C show examples of neural network structures for goal driven animation.

FIG. 3A shows an example of a neural network structure 300A comprising a mixture of experts (MOE) model 302A. The neural network comprises one or more pose encoders 304A, the MOE model 302A and a pose decoder 306A. The pose encoder 304A is configured to receive input data comprising pose data and process it to generate an encoded representation (e.g. a lower-dimensional/latent representation) of the pose data. The encoded representation output by the encoder is input into the MOE model 302A.

The MOE model 302A comprises a plurality of neural network sub-models, $e_1$ to $e_N$ (each of which may be referred to as an "expert") and a gating network, G. Each expert processes the encoded representation to generate respective expert output, which are then combined in a weighted sum 308A. The gating network processes the encoded representation to generate a set of weightings for the weighted sum 308A.

The experts may comprise one or more fully connected networks, one or more convolutional neural networks, and/or one or more gated recurrent units. Many other examples are possible. Additional examples of MOE models are described in further detail in "Twenty Years of Mixture of Experts" (S. E. Yuksel et al., EEE Transactions on Neural Networks and Learning Systems, vol. 23, no. 8, pp. 1177-1193, August 2012), the contents of which are incorporated herein in their entirety.

In some implementations, each of the experts in the MOE model 302A may comprise a four layer model, with one-hundred and twenty-eight, sixty-four and/or thirty-two nodes per expert.

The result of the weighted sum 308A is input into a pose decoder 306A. The pose decoder 306A is configured to process the result of the weighted sum to generate output data comprising intermediate pose markers of the in-game object.

Figure 7:
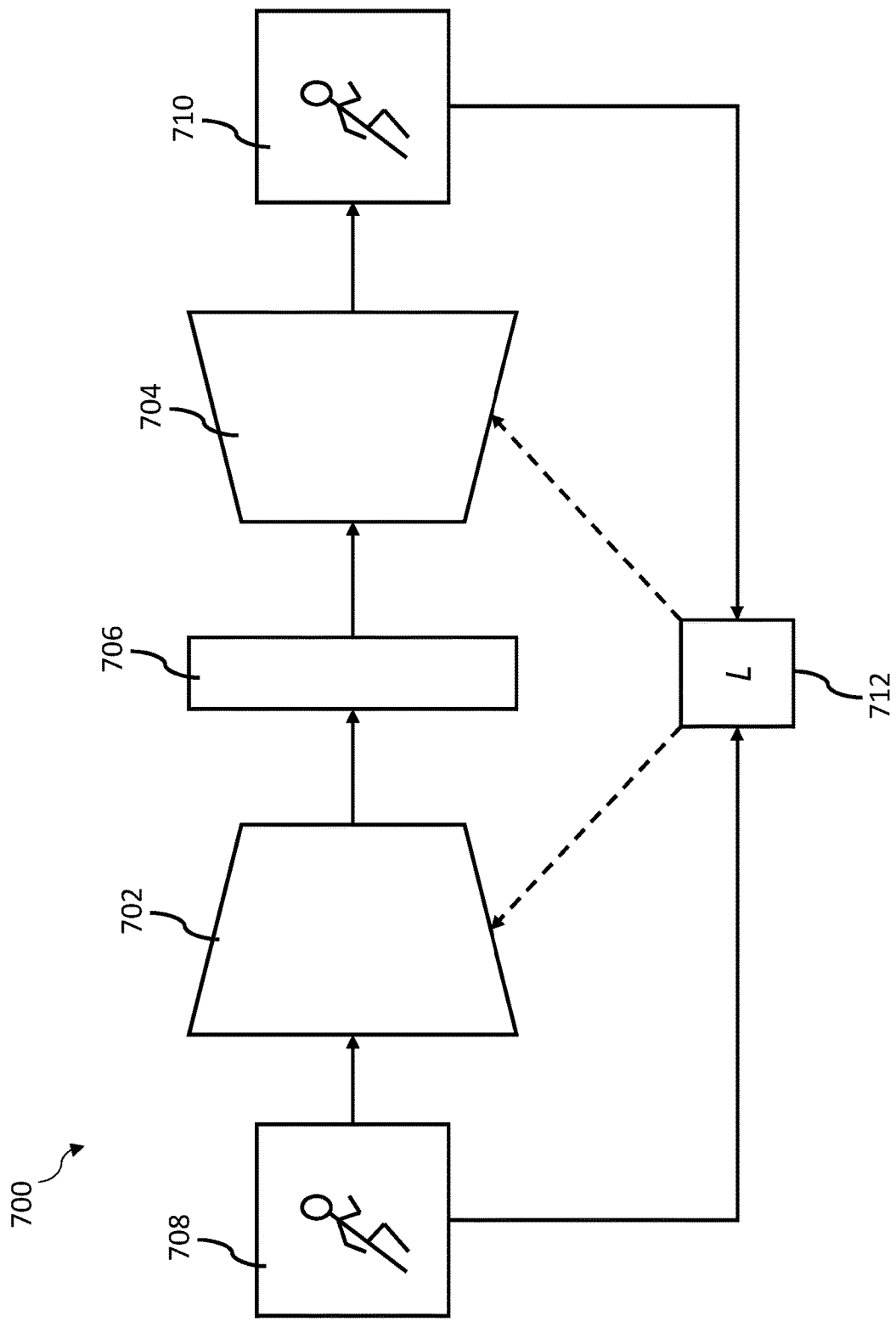
FIG. 7 shows an overview of a method of training an encoder neural network and decoder neural network for use in goal driven animation.

Training of the pose encoder 304A and pose decoder 306A is described in more detail with respect to FIG. 7. The encoder 304A and decoder 306A may have their parameters fixed when training the rest of the neural network 300A.

FIG. 3B shows an example of a neural network structure 300B comprising one or more skip connections 310B (also referred to herein as a "gradient highways"). Such a neural network 302B may be described as a "residual neural network". The neural network comprises one or more pose encoders 304B, the MOE model 302B and a pose decoder 306B, which operate substantially as described above in relation to FIG. 3A.

The skip connection 310B take the encoded representation output by the pose encoder 304B, and adds it to the output of the MOE model 302B. The resulting combined output is input into the pose decoder 306B, which processes it to generate output data comprising intermediate pose markers of the in-game object.

In some implementations, additional skip connections 310B are included that input the encoded representation into intermediate layers of one or more of the experts of the MOE model 302B.

The MOE 302B may, in some implementations, be replaced by other types of neural network.

FIG. 3C shows an example of a neural network structure 300C comprising a current pose encoder 312, a target pose encoder 314 and a trajectory encoder 316.

The current pose encoder 312 receives as input the current pose makers, and processes them to generate an encoded representation of the current pose. The target pose encoder 314 receives as input the target pose makers, and processes them to generate an encoded representation of the target pose. The current/target pose encoder may be trained as described in relation to FIG. 7, and have their parameters fixed when training the rest of the neural network 300C. The trajectory encoder 316 receives as input the object trajectory, and processes it to generate an encoded representation of the trajectory. The trajectory encoder may be trained jointly with the rest of the neural network 300C. Alternatively, the trajectory encoder may be trained separately in a similar way to the encoder and decoder networks.

The encoded representations of the current pose, target pose and trajectory are input into a sub-network 302C of the neural network 300C. The sub-network 302C processes the encoded representations to generate a sub-network output. The sub-network 302C may comprise a MOE model, such as the models described above in relation to FIGS. 3A and 3B. Other types of neural network may alternatively be used as the sub-network.

The sub-network output is combined with the encoded representations of the current pose and the target pose using a combination node 318 to generate an encoded representation of an intermediate pose. The combination node 318 may be configured to combine the sub-network output with the encoded representations using an interpolation operation, e.g.:

$$Pe_2 = M(Pe_1 - Pe_0) + Pe_0$$

where $Pe_2$ is the encoded representation of an intermediate pose, M is the sub-network output, $Pe_1$ is the encoded representation of the target pose and $Pe_0$ is the encoded representation of the current pose. Alternatively, the combination node may implement a sum or a weighted sum of the sub-network output and the encoded representations.

The encoded representation of the intermediate pose is input into a decoder 306C, which processes the encoded representation of the intermediate pose to generate intermediate pose markers.

In some implementations, the sub-network 302C may also take as input a set of control parameters 320. For example, the control parameters may comprise contextual data for the animation, a style and/or cadence associated with the object/motion of the object or the like. Where frames between a known start and end point are being generated, the control parameters may comprise data indicating a position in time between the two frames.

FIG. 4 shows an example of a gated neural network 400 for use in goal driven animation. The gated neural network 400 comprises a gating network 402 and a plurality of sub-networks 404A-L (also referred to as "bins"). Each of the sub-networks 404A-L may have a neural network structure as described in relation to FIGS. 3A-C, or some alternative structure.

Each of the sub-networks 404A-L may be associated with a phase of an animation. An animation may be associated with a global phase and/or one or more local phases. The global phase describes an overall temporal phase of a cyclic animation. Examples of global phases are described in "Phase-functioned neural networks for character control" (D. Holden et al., ACM Transactions on Graphics, Volume 36, Issue 4, Art. No. 42), the contents of which are incorporated herein by reference in their entirety. The local phases each describe a local temporal phase of an animation, and are useful when different parts of the animation are moving asynchronously. Examples of local phases are described in "Local motion phases for learning multi-contact character movements" (S. Starke et al., ACM Transactions on Graphics, Volume 39, Issue 4, Art. No. 54), the contents of which are incorporated herein by reference in their entirety.

The gating network 402 processes phase data (e.g. global and/or local phases) relating to the phase of the animation, and selects one or more of the sub-networks 404A-L for use in determining intermediate pose markers. The gating network 402 may generate a score for each of the sub-networks 404A-L. One or more sub-networks are selected based on the score, e.g. the highest ranking N sub-networks may be selected, where N≥1. In the example shown, the two sub-networks 404B, 404J have been selected by the gating network 402.

The selected one or more sub-networks 404B, 404J prices the input data to generate a set of intermediate pose markers. Where a plurality of sub-networks 404B, 404J have been selected (such as in the illustrated example), the outputs of the selected sub-networks 404B, 404J are combined to generate the overall output of the neural network 400, i.e. the output intermediate pose markers. The sub-network outputs may be combined using a weighted average/blend, where the weightings of the blend based on the scores used to select the sub-networks 404A, 404J.

During training, the training data may be divided up by phase and used to train each of the sub-networks 404A-L separately. This allows for parallelization of the training, greatly reducing the time taken to train the network 400.

Figure 5:
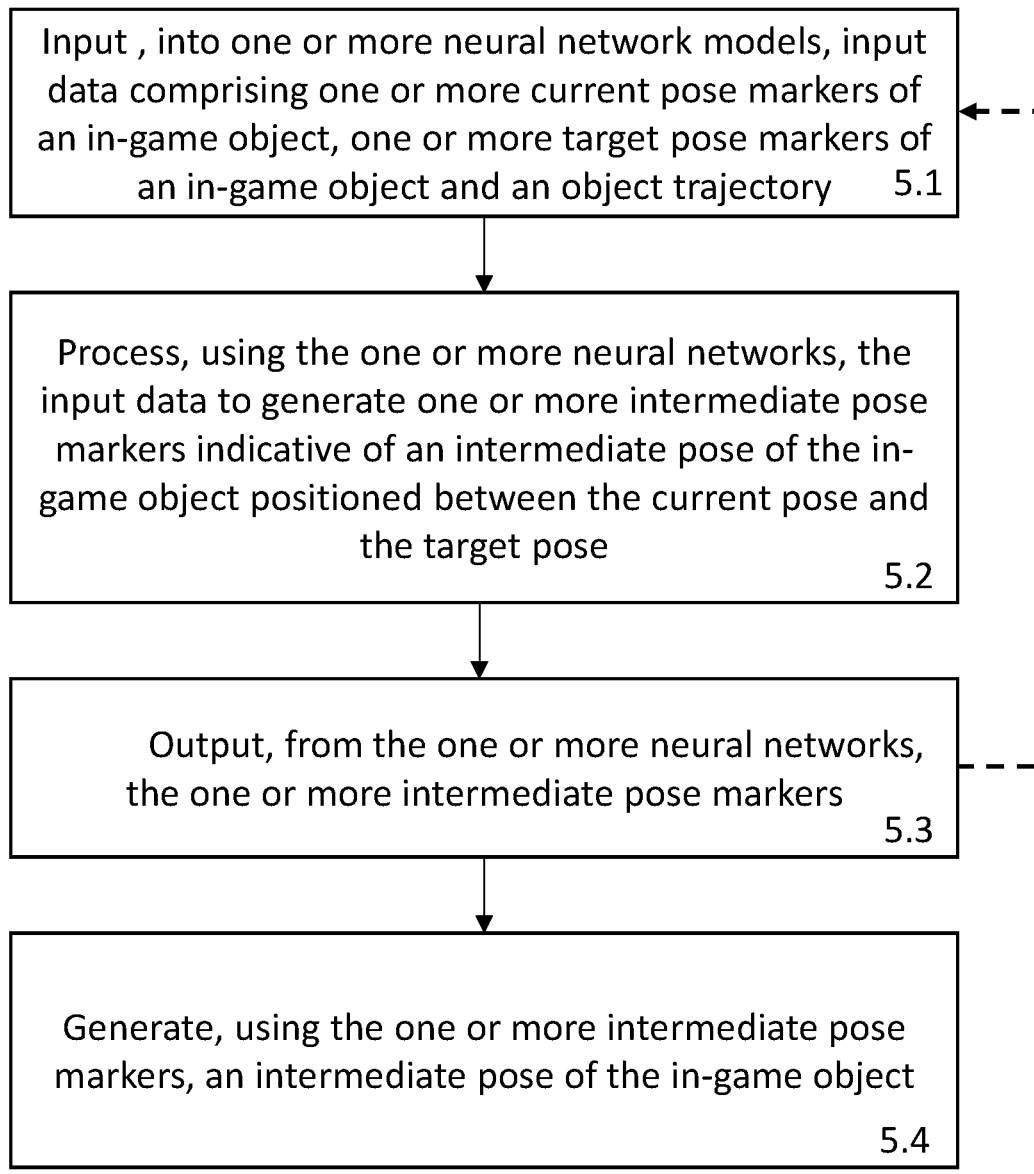
FIG. 5 shows a flow diagram of an example method of goal driven animation.

FIG. 5 shows a flow diagram of an example method of goal driven animation.

At operation 5.1, input data is input into one or more neural network models. The input data comprises one or more current pose markers, one or more target and an object trajectory. The current pose markers encode a current pose of the in-game object. The target pose markers encode a target pose of the in-game object. The trajectory encodes a path through the game space of the in-game object from the current position of the object to a position at which the target pose is required.

The pose markers may comprise locations and/or orientations of key points of a model of the in-game object. The pose markers may alternatively or additionally comprise parameters of a parametrized model of the in-game object. The pose markers may be extracted from a model of the in-game object in the current/target pose. The marker may be extracted directly from the model (e.g. be parameters of the model).

In some implementations, the input data may further comprise one or more previous pose markers indicative of a previous pose of the in-game object that occurred in game time prior to the current pose.

At operation 5.2, the input data is processed using the one or more neural networks to generate one or more intermediate pose markers. The intermediate pose markers are indicative of an intermediate pose of the in-game object positioned between the current pose and the target pose. The intermediate pose may correspond to a pose of the in-game object at the next animation frame following the frame in which the object is in the current pose.

The one or more neural networks may comprise a fully connected network, a mixture of experts network and/or a residual network. A neural network may comprise one or more sub-networks. The sub-networks may comprise one or more of: one or more encoder neural networks; a decoder neural network; a MoE model; a fully connected neural network; a convolutional neural network; and/or a recurrent neural network, such as a gated recurrent network.

The neural network may comprise a gating network configured to use one or more phases of the current pose of the in-game object to select the one or more neural networks from a plurality of neural networks. The one or more phases may comprise global phase and/or one or more local phases. For example, where the in-game object is a human, the phase may correspond to a phase of a running motion.

In some implementations, two or more neural networks are selected, and their output is combined when generating the intermediate pose markers. The two or more neural networks may be selected based on scores generated by the gating network for each neural network in the plurality of neural networks. A weighted average may be used to combine the outputs of the selected two or more neural networks, where the weights are based on the scores for the selected networks.

At operation 5.3, the one or more intermediate pose markers are output from the neural network. The intermediate pose markers may have a one-to-one correspondence with the pose markers of the current pose (i.e. the neural network outputs all the pose markers of the object). Alternatively, the intermediate pose markers may correspond to a subset of the current pose markers.

At operation 5.4, an intermediate pose of the in-game object is generated from the intermediate pose markers. Generating the intermediate pose of the in-game object may comprise generating an animation frame comprising the in-game object in the intermediate pose.

The one or more intermediate pose markers output by the neural network at operation 5.3 may be used as a current pose for a further iteration of the method, which will generate one or more further intermediate pose markers corresponding to a pose of the in-game object positioned between the intermediate pose of the in-game object and the target pose of the in-game object, e.g. the pose of the object in the next animation frame. These further intermediate pose markers are used to generate a further intermediate pose of the in-game object, corresponding to a pose of the in-game object at a further intermediate frame of in-game animation between the intermediate frame of in-game animation and the target frame of in-game animation in which the in-game object is in the target pose.

Figure 6:
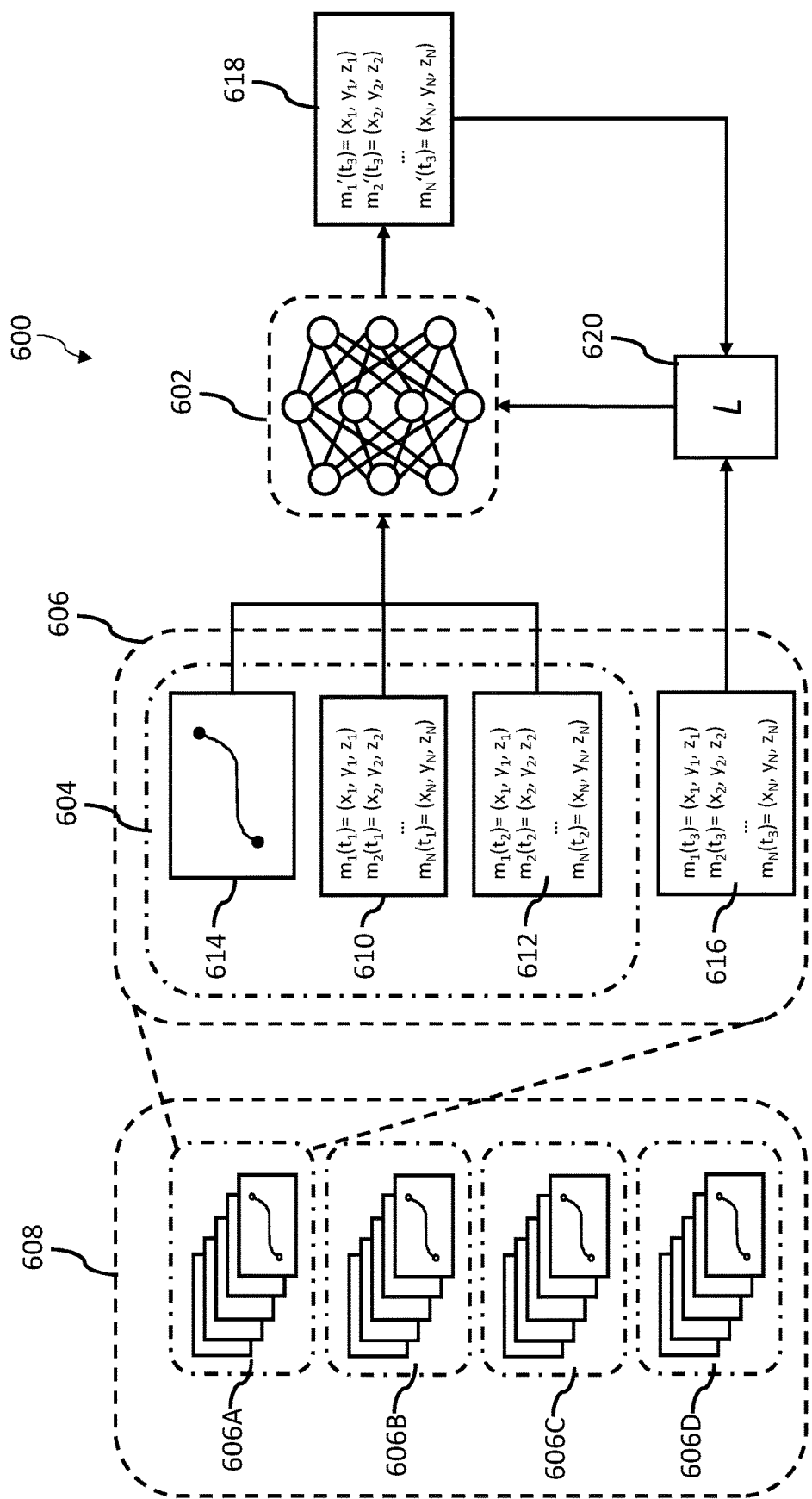
FIG. 6 shows an overview of a method of training a neural network for goal driven animation.

FIG. 6 shows an overview of a method 600 of training a neural network 602 for goal driven animation.

A set of input data 604 from a training sample 606 in a set of training data 608 is input into the neural network 602. The set of input data comprises a set of pose markers of an object at first time ($t_1$) 610, a set of pose markers of the object at a second ($t_2$) 612, and trajectory data 614 indicating a path of the object. The second time is later than the first time. The training sample further comprises ground truth pose markers 616 at one or more intermediate times positioned between the first and second times.

The neural network 602 processes the input data 604 based on current values of its parameters to generate a candidate set of pose markers 618 at a third time, $t_3$. The third time lies between the first and second times, and corresponds to the time of one of the sets of ground truth pose markers 616.

The candidate set of pose markers 618 is compared to the corresponding ground truth pose markers using a pose loss function 620 (also referred to as a "pose objective function"). The pose loss 620 may comprise a weighted sum of differences between respective pose markers in the set of candidate pose markers 618 and corresponding pose markers in the set of ground truth pose markers 616. The differences may be measured using, for example, an L2 or L1 loss.

The weighting of a marker in the loss function 620 may depend on the relative importance of the object feature associated with that marker in the pose of the object. For example, the weighting of foot markers in a human may be weighted higher than hand/arm markers and/or a head marker.

Updates to the parameters of the neural network 602 may be determined based on the value of the loss function 620. For example, an optimization routine may be applied to the loss function 620 in order to determine the parameter updates. Examples of such optimization routines include, but are not limited to, stochastic gradient descent. In some implementations, each set of parameter updates is determined based on the value of the loss function 620 for a plurality of training samples 606.

The training process may be iterated until a threshold condition is satisfied. The threshold condition may comprise a threshold number of training epochs and/or a threshold performance on a test dataset.

The training data 608 comprises a plurality of training samples 606A-D. Each training sample 606A-D comprises a sequence of sets of pose markers corresponding to the motion of an object and a trajectory of the object. One or more of the pose markers/sequence of pose markers may be obtained from motion capture data, e.g. motion capture data of humans performing actions relevant to the game, such as playing soccer.

Given a set of motion capture data, training examples can be generated by extracting transition portions from the motion capture data, identifying a starting pose and a final pose and generating the trajectory between them. The training sample may then be divided into subsets based on the phase of the motion, and each subset may be used to train a different subnetwork of the neural network (for example as described in relation to FIG. 4).

Where motion capture data availability is limited, the training samples can be augmented with simulated training data. Additional pose data can be simulated using an in-game engine to augment the training dataset.

FIG. 7 shows an overview of a method 700 of training an encoder neural network 702 and decoder neural network 704 for use in goal driven animation. Once trained, the encoder neural network 702 may be used to generate a pose embedding 706 from the pose of an in-game object 708, and the decoder 704 may be used to reconstruct a pose of an in-game object 710 from a pose embedding 706. The encoder and/or decoder neural networks may be used as subnetworks of the one or more neural networks used in the goal-driven animation process, for example, the neural network structures described in relation to FIG. 3.

The training method 700 is a self-supervised training method. The training data comprises a plurality of sets of pose markers, each set of pose markers indicative of a pose of an in-game object. During training, an input set of pose markers 708 is selected from the training data and input into the encoder 702. The encoder 702 processes the input set of pose markers 708 based on current values of parameters of the encoder 702 to generate a pose embedding 706. The pose embedding 706 is typically a lower dimensional/encoded representation of the input set of pose markers 708.

The pose embedding 706 is input into the decoder 704, which processes the pose embedding 706 based on current values of parameters of the decoder 704 to generate a reconstructed set of pose markers 710. The reconstructed set of pose markers 710 is compared to the input set of pose parameters 708 using a loss/objective function 712, and updates to parameters of the encoder 702 and/or decoder 704 are determined based on the comparison.

The loss/objective function 712 may, for example, be an L2 loss between the input pose markers 708 and the reconstructed pose markers 710. It will be appreciated that other types of loss may alternatively be used. The parameter updates may be determined by applying an optimisation routine to the loss/objective function 712, such as stochastic gradient descent.

During training of a neural network for GDA, for example as described in relation to FIG. 6, parameters of the encoder and/or decoder may be frozen (i.e. not updated during the training of the GDA neural network).

A trajectory encoder and/or decoder may be trained in an analogous way, with the training data replaced by sets of trajectory data.

Figure 8:
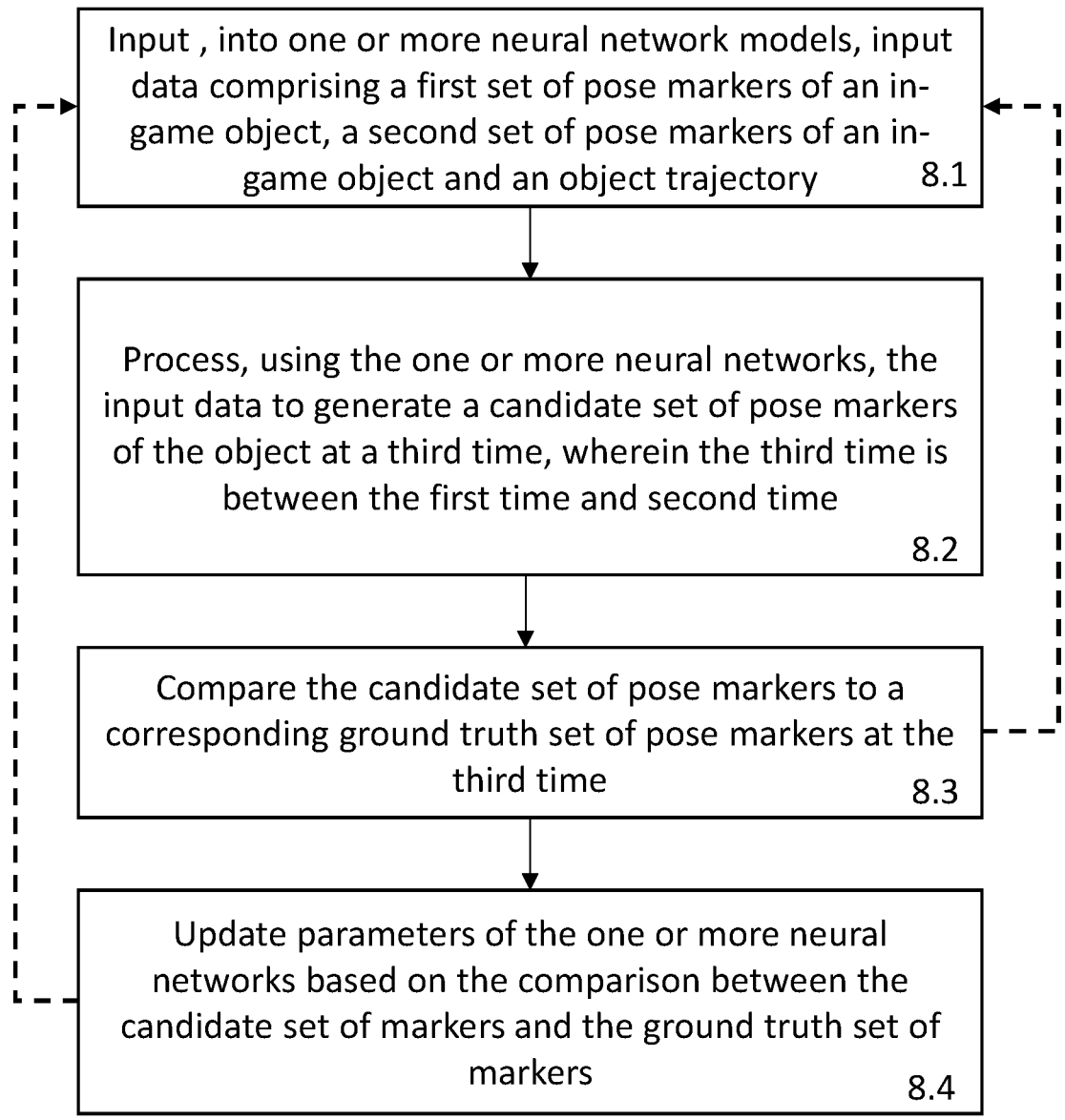
FIG. 8 shows a flow diagram of an example method of training a neural network for goal driven animation.

FIG. 8 shows a flow diagram of an example method of training a neural network for goal driven animation. The method may be implemented by one or more computers operating in one or more locations.

At operation 8.1, input data comprising a first set of pose markers of an in-game object, a second set of pose markers of an in-game object and an object trajectory is input into one or more neural networks. The first set of pose markers are associated with a first time. The second set of pose markers are associated with a second time. The second time is subsequent to the first time. The input data is from a training dataset comprising a plurality of sequences of sets of pose markers corresponding to an animation of an in-game object. The training data may be generated from a motion capture process.

In some implementations, the input data may further comprise sets of pose markers of the in-game object from one or more times prior to the first time.

In some implementations, the one or more neural networks are selected from a plurality of neural networks in dependence on a phase of the pose of the object at the first time. The selection may be performed by a gating network. Parameters of the gating network may, in some implementations, also be updated during the training process.

At operation 8.2, the one or more neural networks generate a candidate set of pose markers corresponding to a candidate pose of the object at a third time. The third time is an intermediate time between the first time and second time.

At operation 8.3, the candidate set of markers is compared to a corresponding ground truth sets of markers in the training dataset. The ground truth markers correspond to ground truth poses of the object at the third time.

The comparison may be performed using a loss/objective function. The objective function may comprises a weighted sum of differences between respective markers in the candidate set of markers and respective corresponding markers in the ground truth set of markers. The differences between markers may be measured using, for example, an L2 loss between a marker in the candidate set of markers and a corresponding marker in the ground truth sets of markers.

Where the object is a humanoid, markers corresponding to the positions of feet of the human may be weighted more highly in the objective function than markers corresponding to other body parts (e.g. hands, shoulders etc.).

At operation 8.4, parameters of the one or more neural networks are updated based on the comparison between the candidate set of markers and the ground truth set of markers. The updates may be determined by applying an optimization procedure to the loss/objective function used to make the comparison, such as stochastic gradient descent.

Operations 8.1 to 8.4 may iterated over a training dataset until a threshold condition is satisfied. The threshold condition may comprise a threshold number of training epochs and/or a threshold performance on a test dataset.

Figure 9:
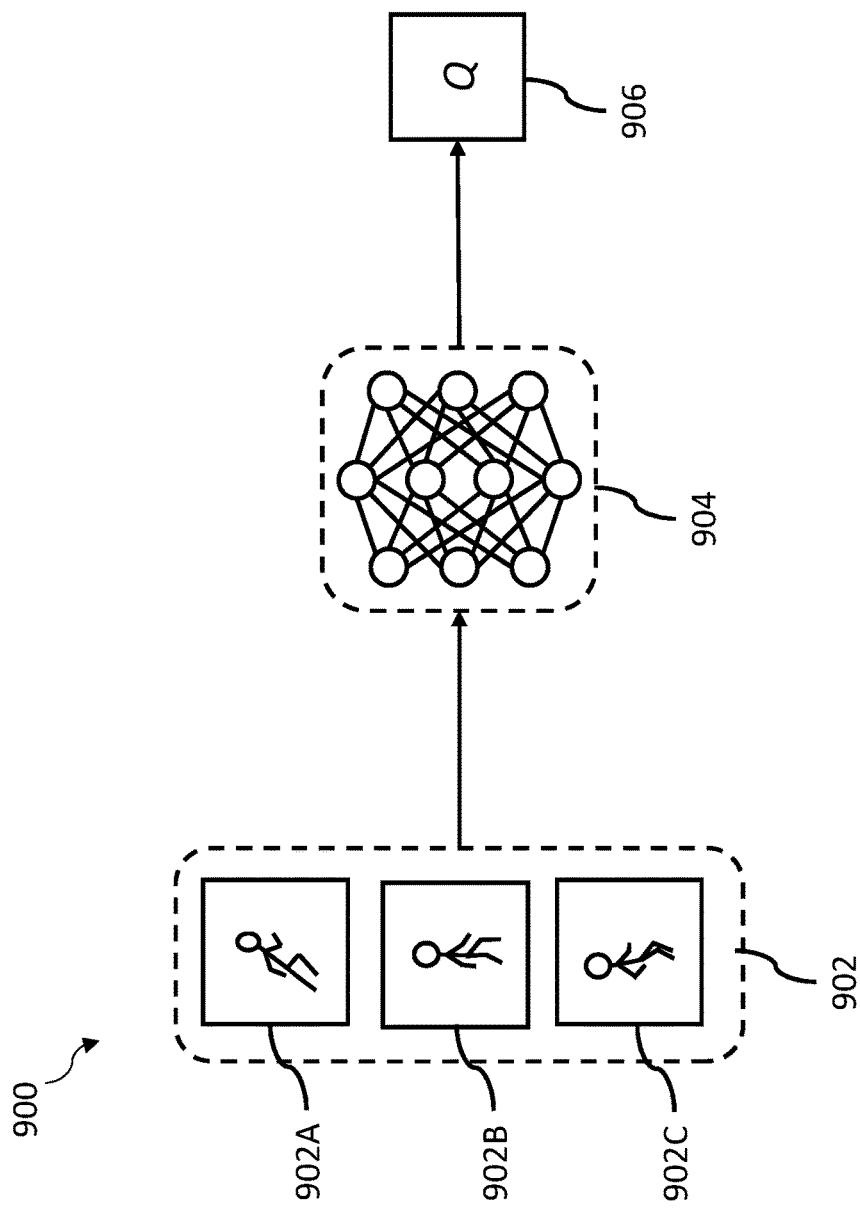
FIG. 9 shows a schematic overview of a method of animation evaluation.

FIG. 9 shows a schematic overview of a method 900 of animation evaluation. One or more sets of pose parameters 902 corresponding to a sequence of frames of animation are input into an evaluator neural network 904, which processes them to generate an animation quality score 906.

The one or more sets of pose parameters 902 may comprise a sequence of sets of pose parameters (in the example shown, three sets of pose parameters 902A-C, with frame 902C corresponding to the latest/current frame), each corresponding to a frame of an animation in a sequence of frames of animation. Each set of pose parameters may comprise locations and/or orientations of key points of a model of the in-game object. For example, the pose markers may comprise positions of key points of the object and the rotations of those points. In the example shown, pose parameters from a sequence of three animation frames are used, but it will be appreciated that sequences of other lengths, e.g. four frames or more, may alternatively be used.

Where the object is a human, the pose parameters may comprise one or more of: one or more footstep markers; one or more hand markers; one or more hip markers; one or more chest markers and one or more head markers.

The neural network 904 may comprise: one or more recurrent layers; one or more fully connected ("dense") layer; and/or one or more convolutional layers. While the neural network 904 is illustrated as a single neural network, it may in general comprise one or more connected neural networks (which may be referred to herein as "sub-networks"). The neural network 904 may include one or more subnetworks, such as an encoder network and/or a decoder network, as described below in relation to FIG. 10A-C.

The neural network 904 may be configured to generate an encoded representation of the input pose parameters 902, for example an embedding vector. This embedded representation may be used to generate the quality score 906. An example of generating a quality score 906 from the embedded representation using a decoder network is described in relation to FIG. to. Alternatively, a scoring network (e.g. an additional sub-network of the neural network 904), for example a linear classifier or a fully connected neural network, may be applied to the embedded representation to generate the quality score 906 directly without reconstructing a pose. The scoring network may be a i-class classifier.

The quality score is indicative of the physical correctness of the pose of the object. For example, where the in-game object is a human, a low quality score may indicate that the pose of the object is physically incorrect and/or unnatural, while a high quality score may indicate that the pose of the object is physically correct and/or a natural pose.

The quality score may be compared with a threshold value to determine whether the animation corresponding to the input pose parameters 902 is an anomalous animation or not. If the comparison indicates that the animation is anomalous, it may be stored in a database alongside metadata relating to the animation. Such metadata may comprise contextualized telemetry relating to the animation (e.g. inputs, game state etc.), the severity of the anomalies in the animation, the animation context or the like. The database may be queried based on this metadata, and links provided to video comprising the animation and, in some embodiments, saved inputs of the events to help debug the problems.

In some embodiments, the animation evaluator may be used to generate and/or augment a training dataset of animations. In general, motion capture data for use in animations is costly and time consuming to capture and process, resulting in limited datasets. To expand these datasets (or replace them), sets of candidate animation data may be generated using an automated process, e.g. using random number generation and/or a ragdoll physics model. The animation evaluator is then be applied to the candidate sets of animation data to generate respective quality scores for them. Based on these quality scores, a high-quality animation dataset is created. For example, only animations with a quality score above a threshold value are used in the training dataset; animations with a quality score below the threshold are discarded.

Figure 10A:
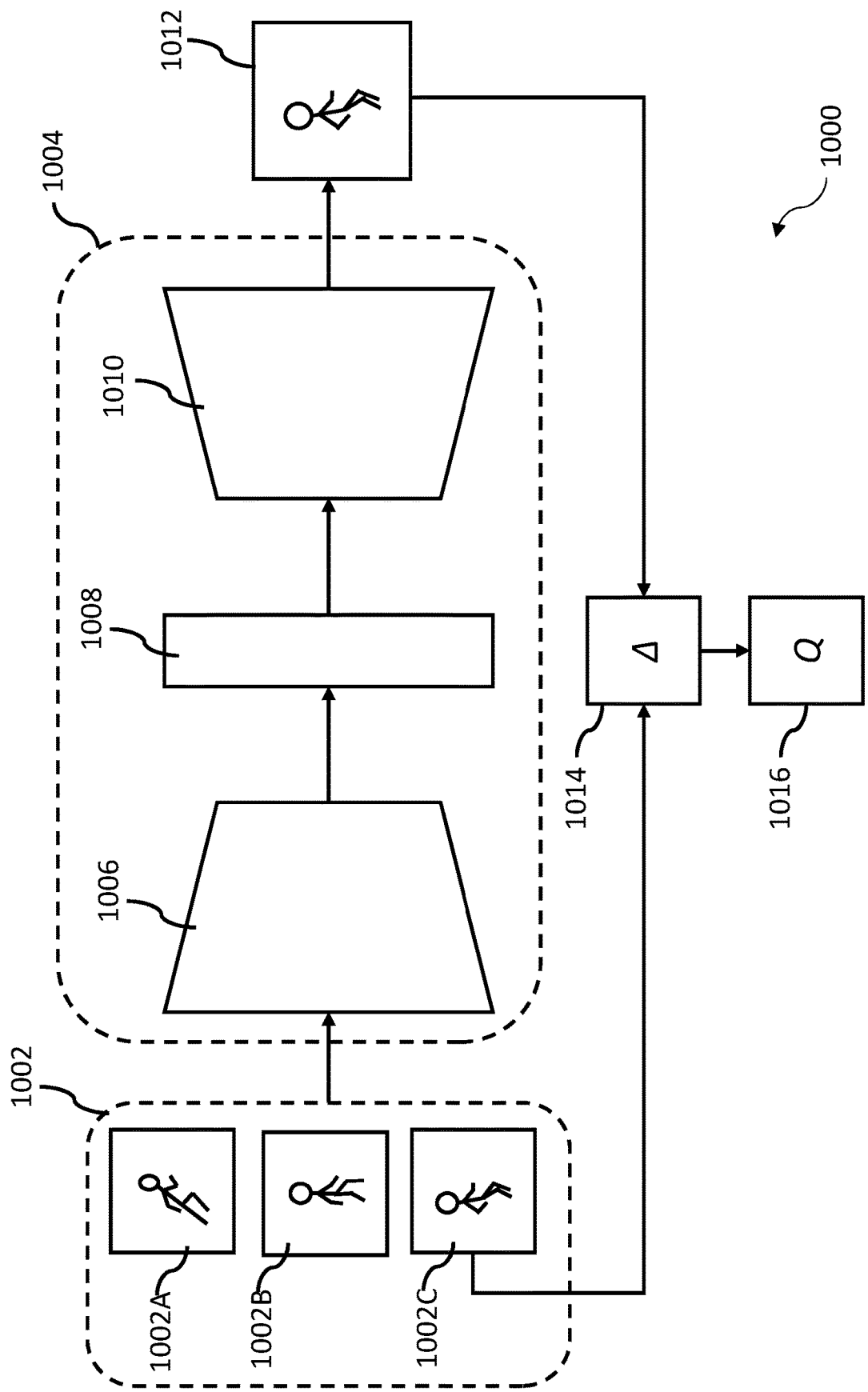
FIGS. 10A-C show overviews of methods of animation evaluation using an autoencoder.

FIG. 10A shows a schematic overview of a further method moo of animation evaluation using an autoencoder 1004. One or more sets of pose parameters 1002 A-C corresponding to a sequence of one or more frames of animation are input into an encoder 1006 of the autoencoder 1004, which processes them to generate an encoded representation/embedding 1008 of the one or more sets of pose parameters 1002. The embedding 1008 is input into a decoder network 1010 of the autoencoder 1004, which processes the embedding 1008 to generate a set of reconstructed pose parameters 1012. The reconstructed set of pose parameters 1012 are compared to a corresponding set of pose parameters 1002C in the input pose parameters 1002 to determine any differences 1014 between them. A quality score 1016 is generated in dependence on the differences.

The corresponding set of input pose parameters 1002C to which the reconstructed pose parameters 1012 are compared may correspond to a current frame (i.e. the latest frame) in the sequence of animation frames being evaluated.

In the example shown, three sets of pose parameters, each corresponding to a frame in a sequence of three frames, are input into the autoencoder 1004. However, in some embodiments, only a single set of pose parameters 1002 corresponding to a single frame of animation are input into the autoencoder 1004. It will be appreciated that sets of pose parameters corresponding to other sequence lengths (e.g. two frames, or four or more frames) may alternatively be used.

The reconstructed set of pose parameters 1012 may be used as a guide to correct the input pose parameters. Since the autoencoder 1004 has been trained using animation/motion capture data of a high quality (as described in relation to FIGS. 13 and 14), the reconstructed pose parameters 1012 are more likely to be accurate than the input pose parameters 1002. They can thus be used to correct the input pose parameters 1002. For example, the corresponding set of pose parameters 1002C may be replaced with the reconstructed pose parameters 1012 to create an updated set of pose parameters. Subsequently, the animation evaluation process may be repeated with the updated set of pose parameters to determine its quality, with additional updates being made to the pose parameters based on the quality score.

In some embodiments, the autoencoder 1004 may have an asymmetric structure, i.e. the encoder and decoder structures may not be mirror images of each other. In such embodiments, the encoder 1006 may have a tree-like structure, with a plurality of input branches, while the decoder 1010 may have a single trunk. Such an autoencoder 1004 may be described as an "asymmetric stacked autoencoder". Where the autoencoder takes as input multiple sets of pose parameters, each corresponding to a different frame, and outputs a single set of pose parameters, the autoencoder may have an a symmetric structure.

Each input branch of the encoder 1006 takes as input a subset of the input pose parameters 1002. In the example shown, the in-game object is a human, and the branches of the encoder each receive a subset of the parameters specifying the pose of the human, e.g. the left arm, left forearm, left hand and left shoulder pose parameters in a first branch; the left shoulder, right shoulder, hip, neck and spine parameters in a second branch etc. In general, pose parameters in a set of pose parameters may be input into one or more of the branches, e.g. the right shoulder parameters are input into both the second and third branches in the example shown.

Figure 10B:
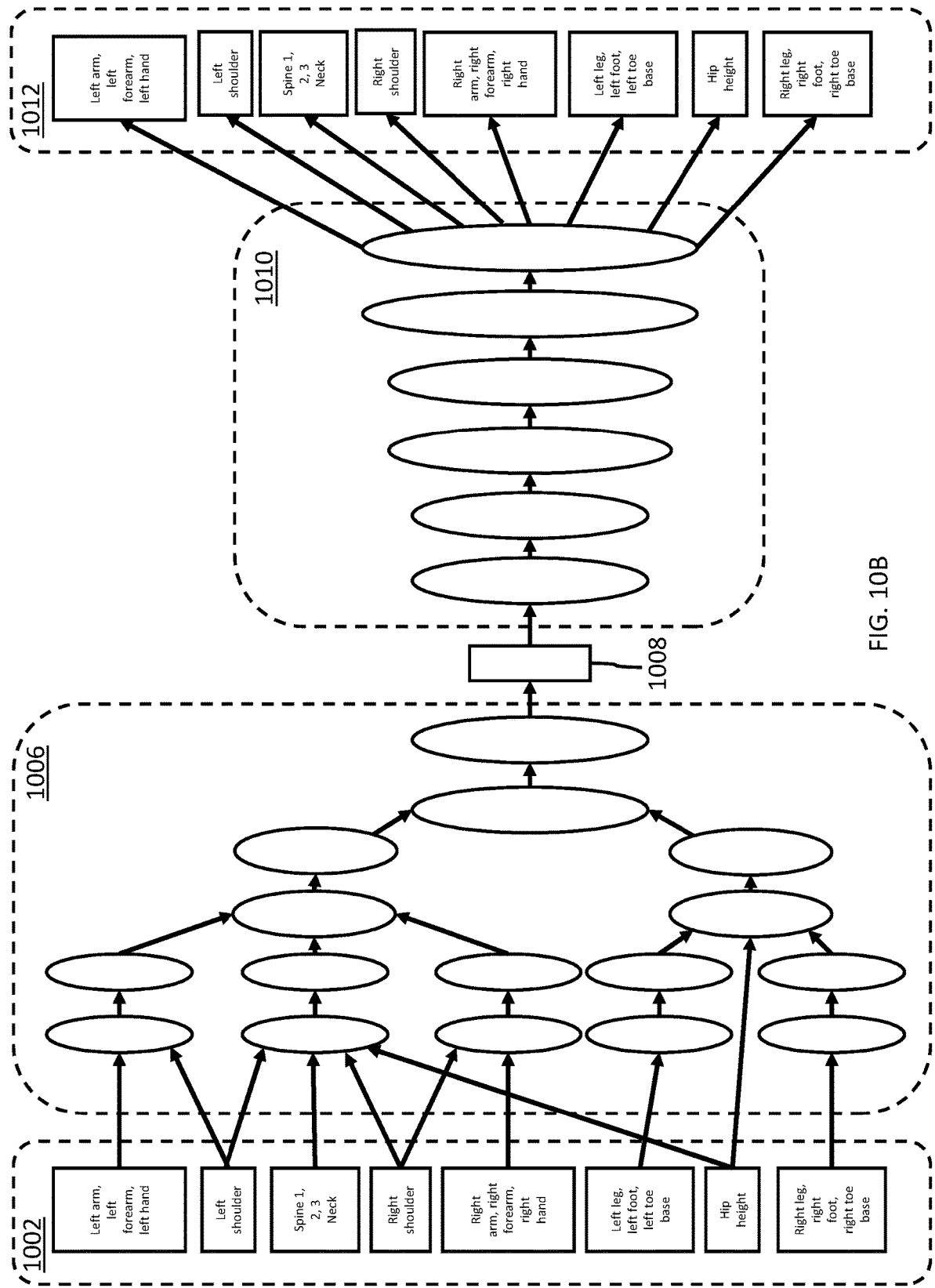

Each branch of the encoder 1006 processes its respective input pose parameters through one or more encoder neural network layers (denoted as ellipses in the encoder 1006 of FIG. 10B). Each encoder layer after the input layer takes as input the output of one or more previous layers. Some of the encoder layers receive as input a combination of the output of a plurality of previous layers, giving the encoder 1006 a tree structure. The final one or more layers of the encoder 1006 combine multiple inputs to generate the embedding 1008.

The decoder 1010 comprises a sequence of decoder layers (denoted as ellipses in the decoder 1010 of FIG. 10B). The input layer receives as input the embedding 1008. Subsequent decoder layers each receive as input the output of a previous layer; there is no branching of the decoder layers in these embodiments. The final layer of the decoder outputs a set of reconstructed pose parameters 1012 corresponding to the input pose parameters 1002.

In some embodiments, each encoder layer of the encoder 1006 and/or each decoder layer of the decoder 1010 may comprise a fully connected layer.

Figure 10C:
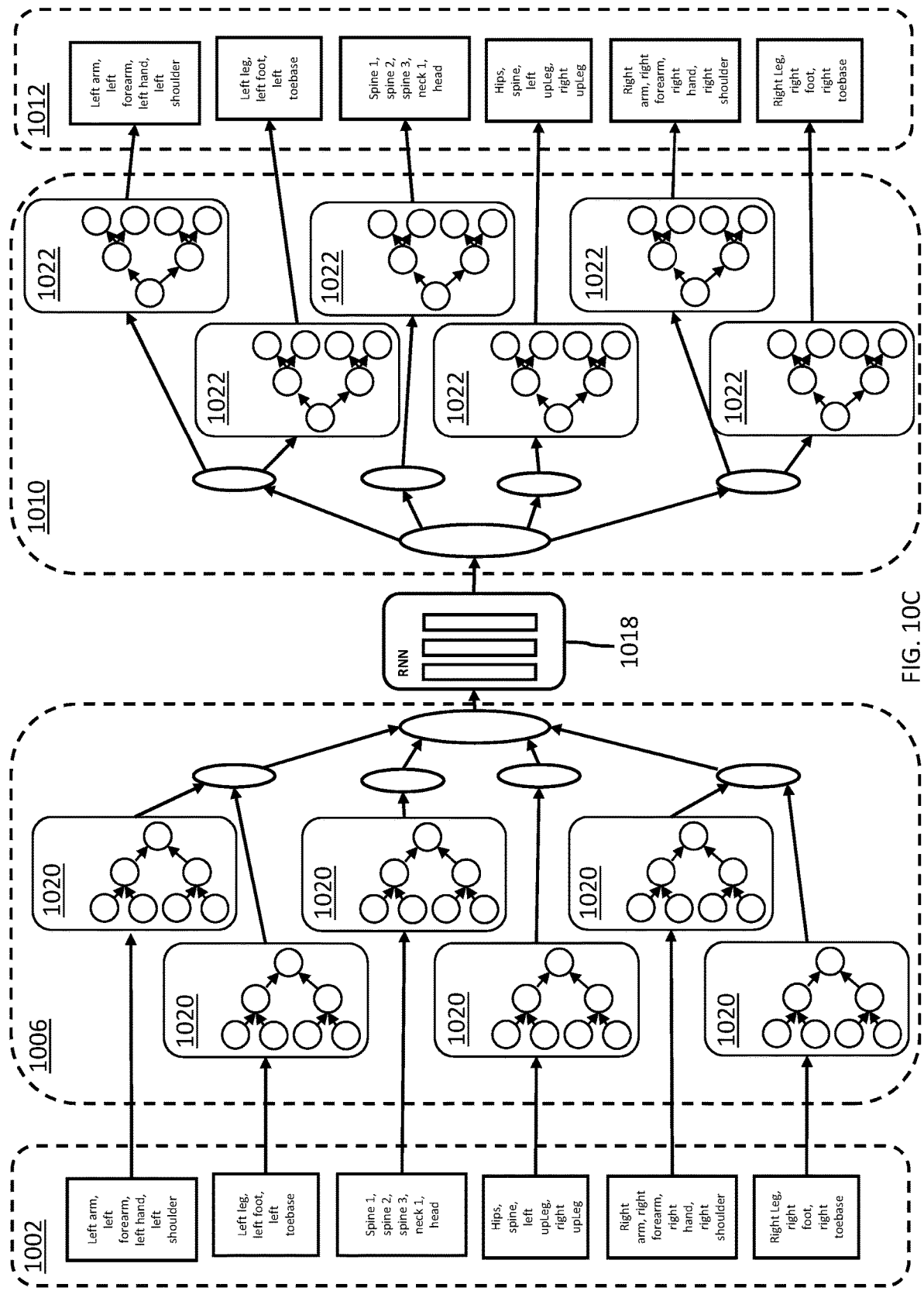

FIG. 10C shows an example of a further autoencoder structure according to some embodiments. In these embodiments, both the encoder 1006 and decoder 1010 have a tree like structure, with the decoder having a plurality of input branches and the decoder having a plurality of output branches. In some embodiments, an RNN 1018 may be positioned between the encoder 1006 and decoder 1010, as shown in FIG. 10C. In some embodiments, the RNN 1018 may form part of the encoder 1006. Alternatively, the RNN 1018 may form part of the decoder 1010. In some embodiments, a plurality of RNNs 1018 may be present and split between the encoder 1006 and decoder 1010, e.g. a first RNN may be part of the encoder 1006 and a second RNN may be part of the decoder 1010.

Each branch of the encoder 1006 processes its respective input pose parameters through one or more encoder neural network layers. Each branch of the encoder 1006 may comprise a respective subnetwork 1020 that itself has a tree-structure, comprising multiple input branches that are combined into a trunk. The outputs of the subnetworks 1020 are combined in one or more further layers of the encoder 1006 network the encoder output (not shown). The output of the encoder may be the embedded representation 1008.

In some embodiments, the encoder output is input into an RNN 1018, which processes the encoder output through one or more of recurrent layers to generate an RNN output (not shown). The output of the RNN may be the embedded representation 1008. The RNN 1018 may comprise a simple RNN, Gated Recurrent Unit (GRU) and/or a Long Short-term Memory (LSTM).

The embedded representation is input into the decoder 1010. The decoder 1010 receives the embedded representation into an input layer, and processes it through a sequence of decoder layers. One or more of the sequence of decoder layers may be branching layers. Branches of the sequence of layers may comprise a respective subnetwork 1022 that itself has a branching structure, comprising an input trunk that splits into a plurality of branches. The outputs of these subnetworks 1020 are the reconstructed pose parameters 1012.

In some embodiments, each encoder layer of the encoder 1006 and/or each decoder layer of the decoder 1010 may comprise a fully connected layer. The nodes of the layers may be associated with an activation function. For example, the nodes may have a (leaky) ReLU activation function, a PReLU activation function, a sigmoid activation function, or the like.

Figure 11:
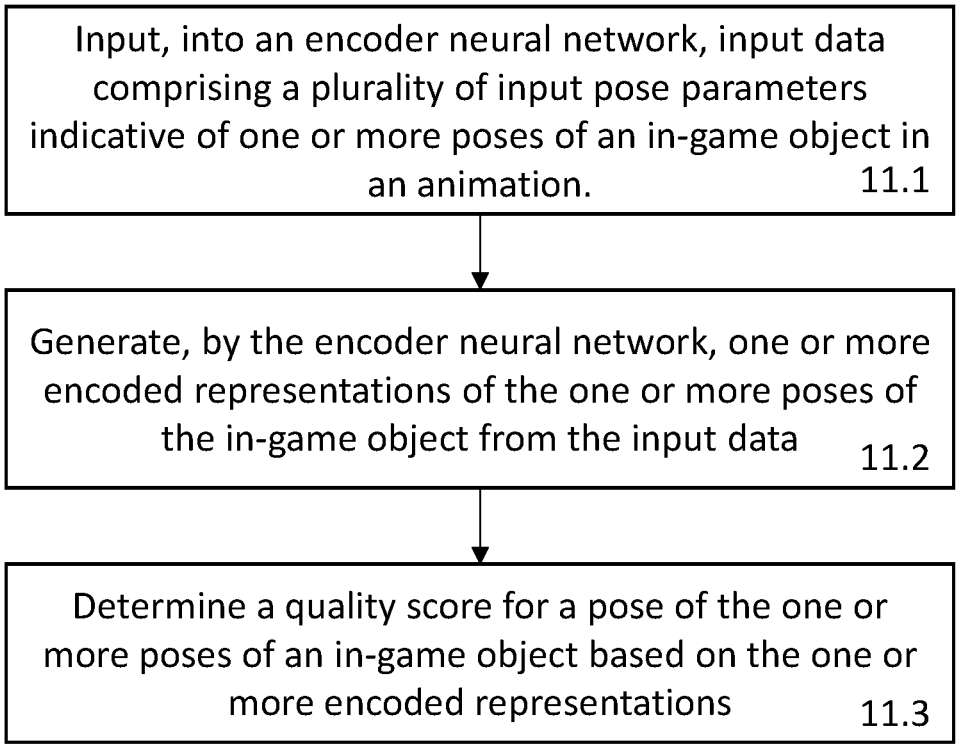
FIG. 11 shows a flow diagram of a method of animation evaluation.

FIG. 11 shows a flow diagram of a method of animation evaluation. The method may be performed by one or more computers operating in one or more locations.

At operation 11.1, input data comprising a plurality of input pose parameters indicative of one or more poses of an in-game object in an animation is input into an encoder neural network.

The in-game object is a human, such a player character or a non-player character. In such embodiments, the input pose parameters may comprise one or more of: one or more footstep markers; one or more hand markers; one or more hip markers; one or more chest markers and one or more head markers.

At operation 11.2, one or more encoded representations of the one or more poses of the in-game object are generated from the input data by the encoder neural network. The encoded representation may be in the form of a vector with a lower dimension than the inputs to the encoder neural network.

At operation 11.3, a quality score for a respective pose of the one or more poses of an in-game object is determined/calculated based on the one or more encoded representations. In some embodiments, the score may be determined using any of the methods described in relation to FIG. 12. Alternatively, a classifier (such as a linear classifier or neural network, etc.) may be applied to the embedded representation to generate the quality score directly.

The quality score may indicate how realistic an animation using the input pose parameters would be. In some embodiments, a high quality score is indicative of a good animation, with a low quality score indicative of a poor animation. Alternatively, in some embodiments, a low quality score is indicative of a good animation, with a high quality score indicative of a poor animation (e.g. a high number of errors).

The quality score may be compared to a threshold value. If the quality score is above the threshold value (or below the threshold value, if a low quality score indicates a high quality animation), the corresponding animation may be rated as a good animation. If the quality score is below the threshold value (or above the threshold value, if a low quality score indicates a high quality animation), the corresponding animation may be rated as a poor quality animation. In response to determining that the quality score is below the threshold value, the corresponding animation may be stored in a library with metadata comprising an indication of the quality score. The metadata may comprise an indication of one or more errors identified in the animation.

The quality score may be used to calibrate a physics engine/simulation. Parameters of the physics engine/simulation may be adjusted based on the quality score, which the goal of creating a high quality animation.

Figure 12:
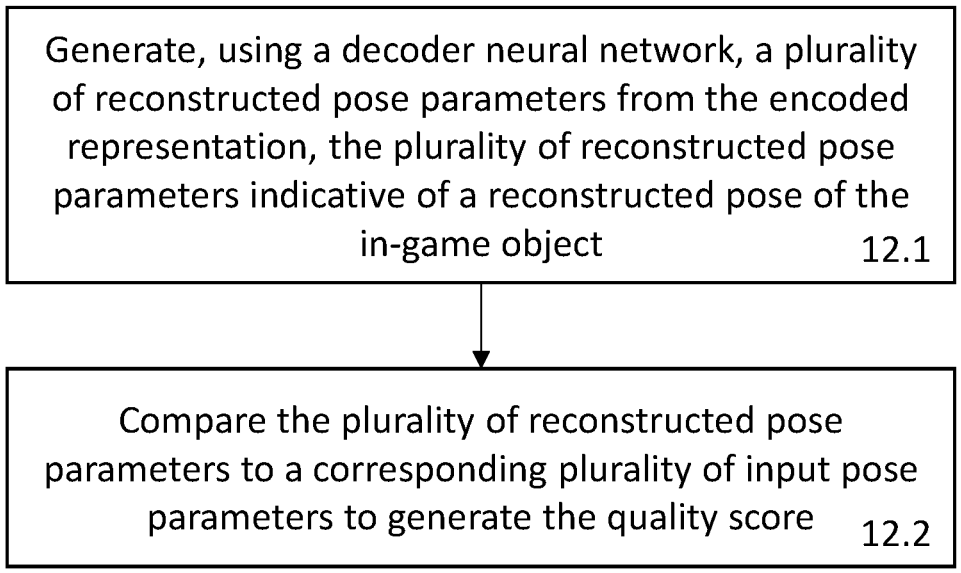
FIG. 12 shows a flow diagram of a method of determining a quality score from an embedded representation of an animation.

FIG. 12 shows a flow diagram of a method of determining a quality score from an embedded representation of an animation.

At operation 12.1, a plurality of reconstructed pose parameters are generated from the encoded representation, using a decoder neural network. The plurality of reconstructed pose parameters are indicative of a reconstructed pose of the in-game object.

At operation 12.2, the plurality of reconstructed pose parameters are compared to a corresponding plurality of input pose parameters in the input data to generate the quality score. Based on the quality score, one or more of the sets of input parameters may be updated.

Figure 13:
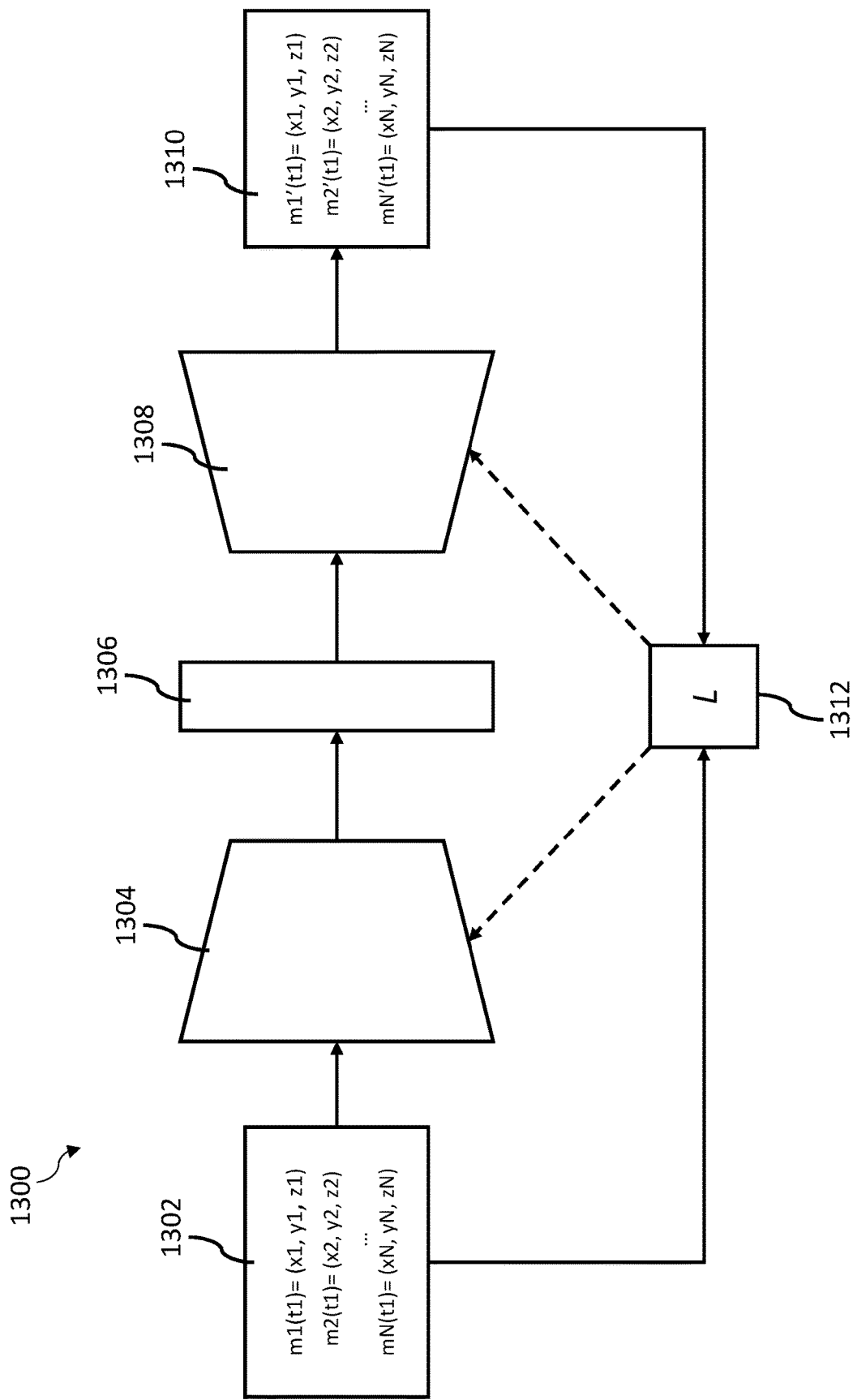
FIG. 13 shows a schematic overview of an example method of training a neural network for animation evaluation.

FIG. 13 shows a schematic overview of an example method 1300 of training a neural network for animation evaluation. The training method is based on an autoencoder, as described above in relation to FIGS. 10A-C.

A training sample 1302 comprising one or more sets of pose parameters from a training dataset is input into an encoder model 1304. The training dataset comprising a plurality of sets of pose data from known high-quality animations and/or motion capture data.

The encoder model 1304 processes the training sample 1302 based on current values of parameters of the encoder model 1304 to generate an embedding 1306 of the training sample. The embedding is input into a decoder model 1308, which processes the embedding 1306 based on current values of parameters of the decoder model 1308 to generate a candidate set of reconstructed pose parameters 1310. The candidate set of set of reconstructed pose parameters 1310 is compared to a corresponding set of pose parameters in the input training sample 1302, for example using a loss/objective function 1312. Updates to parameters of the encoder 1304 and decoder 1306 models are determined based on the comparison with the goal of making the decoder model 1306 accurately reconstruct the input pose parameters.

The encoder model and decoder model may have any of the structures described/shown in relation to FIGS. 10A-C. Once trained, the encoder and decoder model may be used to determine a quality score as described in relation to FIG. 10A and FIG. 12.

The loss/objective function 1312 may, for example, be an L2 loss between a set of the input pose parameters 1302 and the reconstructed pose parameters 1310. It will be appreciated that other types of loss may alternatively be used. The parameter updates may be determined by applying an optimisation routine to the loss/objective function 1312, such as stochastic gradient descent.

In some embodiments, the trained encoder and decoder model may be used to train a scoring model (not shown) that is configured to generate a quality score directly from the embedding 1306 without reconstructing the pose parameters. During training of the scoring model, the scoring model takes as input an embedding 1306 of a set of input pose parameters and processes it to generate a candidate quality score for the set of input pose parameters. This quality score is compared to a "ground truth" quality score obtained by comparing the a set of reconstructed pose parameters generated by the decoder to the input set of pose parameters, as described in relation to FIG. 10A. Based on the comparison, parameters of the scoring model are updated.

Once trained, the scoring model can be used with the trained encoder model to predict a quality score without reconstructing the pose parameters using a decoder.

Figure 14:
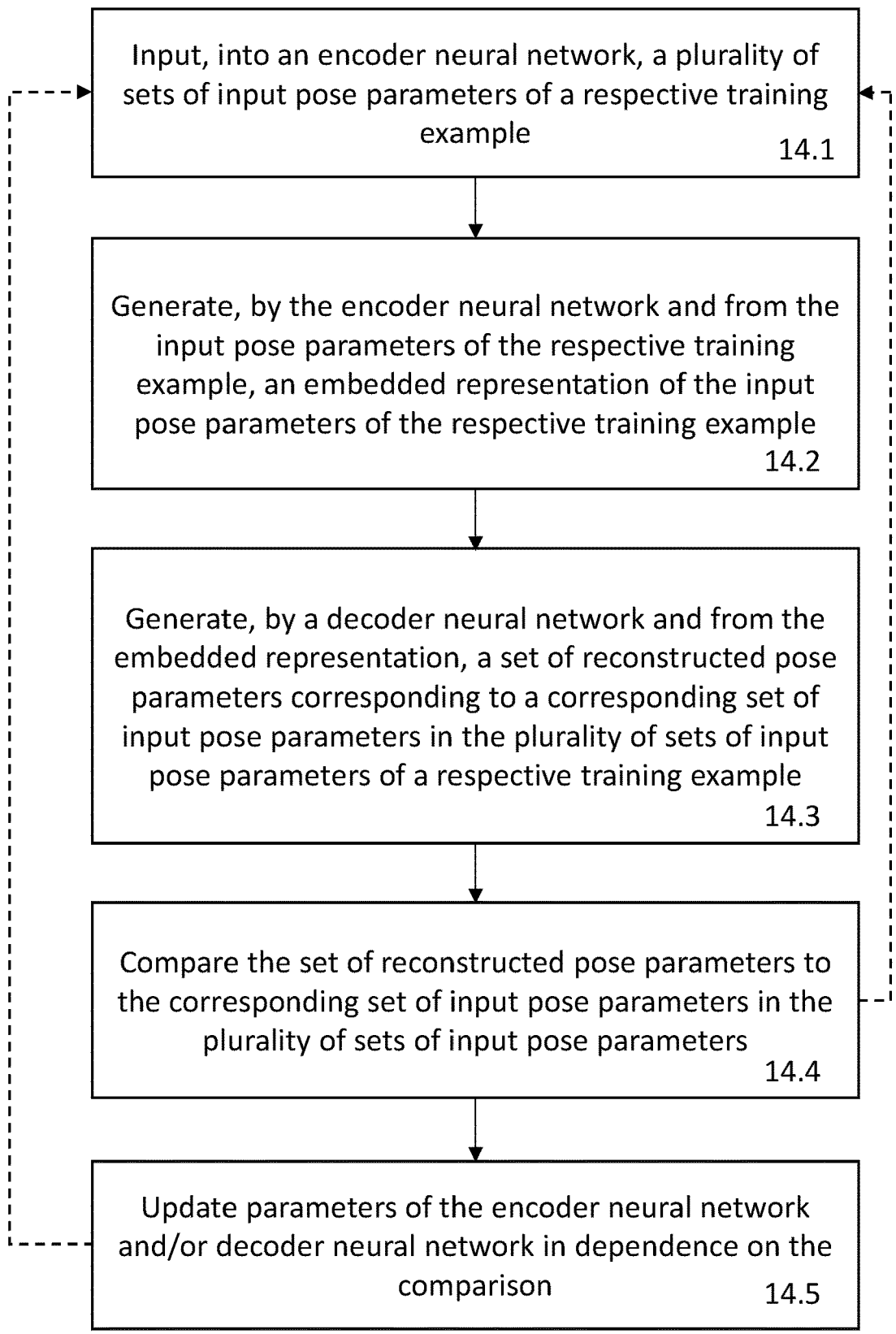
FIG. 14 shows a flow diagram of an example method of training a neural network for animation evaluation.

FIG. 14 shows a flow diagram of an example method of training a neural network for animation evaluation.

At operation 14.1, a plurality of sets of input pose parameters of a respective training example are input into an encoder neural network. Each set of pose parameters may correspond to the pose of an object in an animation frame of an in-game animation.

At operation 14.2, an embedded representation of the input pose parameters of the respective training example is generated from the input pose parameters by the encoder neural network.

At operation 14.3, a set of reconstructed pose parameters corresponding to a corresponding set of input pose parameters in the plurality of sets of input pose parameters of a respective training example is generated from the embedded representation using a decoder neural network.

At operation 14.4, the set of reconstructed pose parameters is compared to the corresponding set of input pose parameters in the plurality of sets of input pose parameters. A loss/objective function, such as an L2 loss, may be used to perform the comparison. The corresponding set of input pose parameters in the plurality of sets of input pose parameters may correspond to a current animation frame of an animation.

Operations 14.1 to 14.4 may be iterated over a batch of training data before proceeding to operation 14.5.

At operation 14.5, parameters of the encoder neural network and/or decoder neural network are updated in dependence on the comparison. An optimization routine may be applied to the loss/objective function in order to determine the parameter updates.

Operations 14.1 to 14.5 may be iterated until a threshold condition is satisfied. The threshold condition may comprise a threshold number of training iterations and/or a threshold performance on a test dataset.

Figure 15:
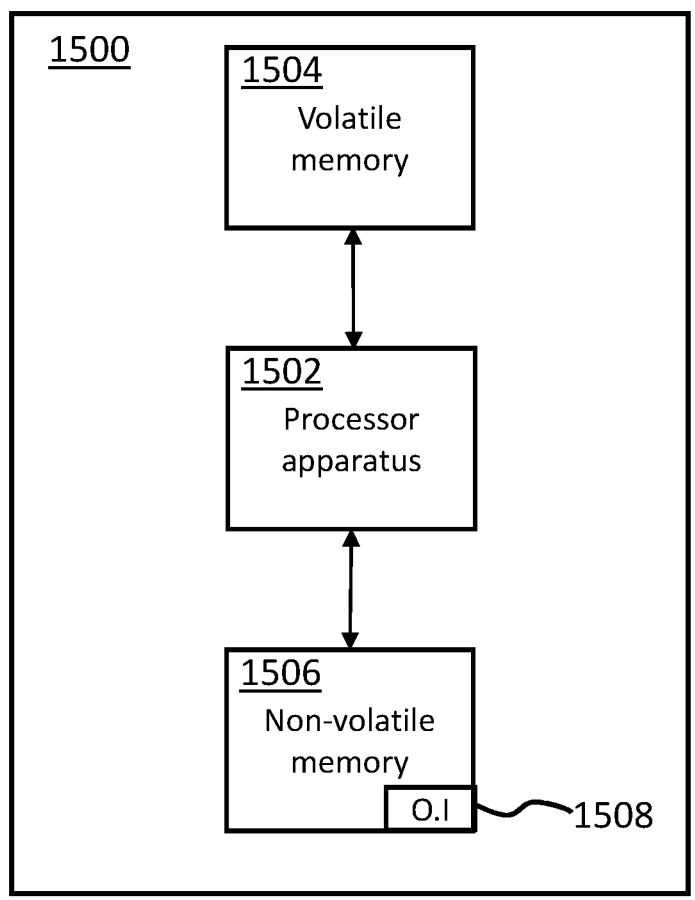
FIG. 15 shows an example of a computing system/apparatus.

FIG. 15 shows a schematic example of a system/apparatus 1500 for performing any of the methods described herein. The system/apparatus shown is an example of a computing device. It will be appreciated by the skilled person that other types of computing devices/systems may alternatively be used to implement the methods described herein, such as a distributed computing system.

The apparatus (or system) 1500 comprises one or more processors 1502. The one or more processors control operation of other components of the system/apparatus 1500. The one or more processors 1502 may, for example, comprise a general purpose processor. The one or more processors 1502 may be a single core device or a multiple core device. The one or more processors 1502 may comprise a Central Processing Unit (CPU) or a graphical processing unit (GPU). Alternatively, the one or more processors 1502 may comprise specialised processing hardware, for instance a RISC processor or programmable hardware with embedded firmware. Multiple processors may be included.

The system/apparatus comprises a working or volatile memory 1504. The one or more processors may access the volatile memory 1504 in order to process data and may control the storage of data in memory. The volatile memory 1504 may comprise RAM of any type, for example Static RAM (SRAM), Dynamic RAM (DRAM), or it may comprise Flash memory, such as an SD-Card.

The system/apparatus comprises a non-volatile memory 1506. The non-volatile memory 1506 stores a set of operation instructions 308 for controlling the operation of the processors 1502 in the form of computer readable instructions. The non-volatile memory 1506 may be a memory of any kind such as a Read Only Memory (ROM), a Flash memory or a magnetic drive memory.

The one or more processors 1502 are configured to execute operating instructions 1508 to cause the system/apparatus to perform any of the methods described herein. The operating instructions 1508 may comprise code (i.e. drivers) relating to the hardware components of the system/apparatus 1500, as well as code relating to the basic operation of the system/apparatus 1500. Generally speaking, the one or more processors 1502 execute one or more instructions of the operating instructions 1508, which are stored permanently or semi-permanently in the non-volatile memory 1506, using the volatile memory 1504 to store temporarily data generated during execution of said operating instructions 1508.

Implementations of the methods described herein may be realised as in digital electronic circuitry, integrated circuitry, specially designed ASICs (application specific integrated circuits), computer hardware, firmware, software, and/or combinations thereof. These may include computer program products (such as software stored on e.g. magnetic discs, optical disks, memory, Programmable Logic Devices) comprising computer readable instructions that, when executed by a computer, such as that described in relation to FIG. 15, cause the computer to perform one or more of the methods described herein.

Any system feature as described herein may also be provided as a method feature, and vice versa. As used herein, means plus function features may be expressed alternatively in terms of their corresponding structure. In particular, method aspects may be applied to system aspects, and vice versa.

Furthermore, any, some and/or all features in one aspect can be applied to any, some and/or all features in any other aspect, in any appropriate combination. It should also be appreciated that particular combinations of the various features described and defined in any aspects of the invention can be implemented and/or supplied and/or used independently.

Although several embodiments have been shown and described, it would be appreciated by those skilled in the art that changes may be made in these embodiments without departing from the principles of this disclosure, the scope of which is defined in the claims It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and are believed to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

The invention claimed is:

1. A computer implemented method comprising:
inputting, into one or more neural networks, input data comprising one or more current pose markers indicative of a current pose of an in-game object, one or more target markers indicative of a target pose of an in-game object and an object trajectory of the in-game object;
processing, using the one or more neural networks, the input data to generate one or more intermediate pose markers indicative of an intermediate pose of the in-game object positioned between the current pose and the target pose;
outputting, from the one or more neural networks, the one or more intermediate pose markers;
generating, using the one or more intermediate pose markers, the intermediate pose of the in-game object, wherein the intermediate pose of the in-game object corresponds to a pose of the in-game object at an intermediate frame of in-game animation between a current frame of in-game animation in which the in-game object is in the current pose and a target frame of in-game animation in which the in-game object is in the target pose;
inputting, into the one or more neural networks, a second set of input data comprising the one or more intermediate pose markers, the one or more target markers and the object trajectory;
processing, using the one or more neural networks, the second set of input data to generate one or more further intermediate pose markers indicative of a further intermediate pose of the in-game object positioned between the intermediate pose of the in-game object and the target pose of the in-game object;
outputting, from the one or more neural networks, the one or more further intermediate pose markers; and
generating, using the one or more further intermediate pose markers, a further intermediate pose of the in-game object, wherein the further intermediate pose of the in-game object corresponds to a pose of the in-game object at a further intermediate frame of in-game animation between the intermediate frame of in-game animation and the target frame of in-game animation in which the in-game object is in the target pose.

2. The method of claim 1, wherein the method further comprises;
determining one or more phases of the current pose; and
selecting the one or more neural networks from a plurality of neural networks in dependence on the one or more phases.

3. The method of claim 2, wherein selecting the one or more neural networks from the plurality of neural networks comprises:

selecting two or more neural networks of the plurality of neural networks in dependence on the one or more phases of the current pose, wherein outputting the one or more intermediate pose markers comprises combining output of the selected two or more neural networks.

4. The method of claim 3, selecting two or more neural networks of the plurality of neural networks comprises:

determining, using a gating neural network, a score for each of the plurality of neural networks; and selecting two or more neural networks of the plurality of neural networks in dependence on the scores for each of the plurality of neural networks.

5. The method of claim 1, wherein the input data further comprises one or more previous pose markers indicative of one or more previous poses of the in-game object occurring prior to the current pose.

6. The method of claim 1, wherein the one or more neural networks comprises: a fully connected network; a mixture of experts network; and/or a residual network.

7. The method of claim 1, wherein the in-game object is a human and wherein the one or more current pose markers, one or more target pose markers and/or the one or more intermediate pose markers comprise one or more of: one or more footstep markers; one or more hand markers; one or more hip markers; one or more chest markers and one or more head markers.

8. A non-transitory computer readable medium comprising computer readable instructions that, when executed by a computing device, causes the computing device to perform operations comprising:

inputting, in to one or more neural networks, input data comprising one or more current pose markers indicative of a current pose of an in-game object, one or more target markers indicative of a target pose of an in-game object and an object trajectory of the in-game object;

processing, using the one or more neural networks, the input data to generate one or more intermediate pose markers indicative of an intermediate pose of the in-game object positioned between the current pose and the target pose;

outputting, from the one or more neural networks, the one or more intermediate pose markers;

generating, using the one or more intermediate pose markers, the intermediate pose of the in-game object, wherein the intermediate pose of the in-game object corresponds to a pose of the in-game object at an intermediate frame of in-game animation between a current frame of in-game animation in which the in-game object is in the current pose and a target frame of in-game animation in which the in-game object is in the target pose;

inputting, into the one or more neural networks, a second set of input data comprising the one or more intermediate pose markers, the one or more target markers and the object trajectory;

processing, using the one or more neural networks, the second set of input data to generate one or more further intermediate pose markers indicative of a further intermediate pose of the in-game object positioned between the intermediate pose of the in-game object and the target pose of the in-game object;

outputting, from the one or more neural networks, the one or more further intermediate pose markers; and generating, using the one or more further intermediate pose markers, a further intermediate pose of the in-game object, wherein the further intermediate pose of the in-game object corresponds to a pose of the in-game object at a further intermediate frame of in-game animation between the intermediate frame of in-game animation and the target frame of in-game animation in which the in-game object is in the target pose.

9. The non-transitory computer readable medium of claim 8, wherein the operations further comprise:

determining one or more phases of the current pose; and selecting the one or more neural networks from a plurality of neural networks in dependence on the one or more phases.

10. The non-transitory computer readable medium of claim 9, wherein selecting the one or more neural networks from the plurality of neural networks comprises:

selecting two or more neural networks of the plurality of neural networks in dependence on the one or more phases of the current pose, wherein outputting the one or more intermediate pose markers comprises combining output of the selected two or more neural networks.

11. The non-transitory computer readable medium of claim 10, wherein selecting two or more neural networks of the plurality of neural networks comprises:

determining, using a gating neural network, a score for each of the plurality of neural networks; and selecting two or more neural networks of the plurality of neural networks in dependence on the scores for each of the plurality of neural networks.

12. The non-transitory computer readable medium of claim 8, wherein the input data further comprises one or more previous pose markers indicative of one or more previous poses of the in-game object occurring prior to the current pose.

13. The non-transitory computer readable medium of claim 8, wherein the one or more neural networks comprises: a fully connected network; a mixture of experts network; and/or a residual network.

14. The non-transitory computer readable medium of claim 8, wherein the in-game object is a human and wherein the one or more current pose markers, one or more target pose markers and/or the one or more intermediate pose markers comprise one or more of: one or more footstep markers; one or more hand markers; one or more hip markers; one or more chest markers and one or more head markers.

* * * * *